(12) United States Patent
Sakakibara

(10) Patent No.: US 9,654,019 B2
(45) Date of Patent: May 16, 2017

(54) CONTROL METHOD FOR DIRECT POWER CONVERTER

(71) Applicant: DAIKIN INDUSTRIES, LTD., Osaka-shi, Osaka (JP)

(72) Inventor: Kenichi Sakakibara, Kusatsu (JP)

(73) Assignee: DAIKIN INDUSTRIES, LTD., Osaka-shi (JP)

( * ) Notice: Subject to any disclaimer, the term of this patent is extended or adjusted under 35 U.S.C. 154(b) by 0 days.

(21) Appl. No.: 15/027,558

(22) PCT Filed: Oct. 7, 2014

(86) PCT No.: PCT/JP2014/076822
§ 371 (c)(1),
(2) Date: Apr. 6, 2016

(87) PCT Pub. No.: WO2015/053271
PCT Pub. Date: Apr. 16, 2015

(65) Prior Publication Data
US 2016/0248335 A1     Aug. 25, 2016

(30) Foreign Application Priority Data
Oct. 7, 2013   (JP) .................................. 2013-210192

(51) Int. Cl.
*H02M 1/08*     (2006.01)
*H02M 5/458*    (2006.01)
(Continued)

(52) U.S. Cl.
CPC .............. *H02M 5/458* (2013.01); *H02M 1/08* (2013.01); *H02M 1/14* (2013.01); *H02M 1/4225* (2013.01);
(Continued)

(58) Field of Classification Search
USPC .. 363/44, 40, 39, 126, 55, 97, 98, 131, 132, 363/135, 136, 137, 35–37
See application file for complete search history.

(56) References Cited

U.S. PATENT DOCUMENTS

| | | | | |
|---|---|---|---|---|
| 2009/0086515 A1* | 4/2009 | Sakakibara | ......... | H02M 5/4585 363/37 |
| 2011/0025246 A1* | 2/2011 | Sakakibara | ......... | H02M 1/4216 318/400.42 |
| 2012/0187929 A1* | 7/2012 | Ohshita | ............... | H02M 3/1584 323/272 |

FOREIGN PATENT DOCUMENTS

| | | |
|---|---|---|
| JP | 2011-193678 A | 9/2011 |
| JP | 2012-135184 A | 7/2012 |

OTHER PUBLICATIONS

International Search Report for PCT/JP2014/076822 (PCT/ISA/210) mailed on Jan. 13, 2015.
(Continued)

*Primary Examiner* — Timothy J Dole
*Assistant Examiner* — Bryan R Perez
(74) *Attorney, Agent, or Firm* — Birch, Stewart, Kolasch & Birch, LLP

(57) ABSTRACT

A converter performs full-wave rectification on a single-phase voltage, thus outputting a rectified voltage across DC power supply lines. An inverter receives the rectified voltage and then supplies a three-phase AC current to an inductive load. Between the DC power supply lines is connected a charge and discharge circuit. The charge and discharge circuit includes a buffer circuit and a boost circuit. The buffer circuit includes a series connection between a capacitor and a switch. The boost circuit, which may be configured by a boost chopper, includes a switch, a reactor and a diode.

(Continued)

The charge and discharge circuit provides and receives part of pulsations of the power input to the converter between the DC power supply lines.

20 Claims, 10 Drawing Sheets

(51) Int. Cl.
    *H02M 1/14*       (2006.01)
    *H02M 1/42*       (2007.01)
    *H02M 5/40*       (2006.01)
    *H02M 5/44*       (2006.01)
    *H02M 1/00*       (2006.01)

(52) U.S. Cl.
    CPC ................ *H02M 5/40* (2013.01); *H02M 5/44* (2013.01); *H02M 5/4585* (2013.01); *H02M 2001/0093* (2013.01); *Y02B 70/126* (2013.01)

(56) References Cited

OTHER PUBLICATIONS

Ohnuma et al. "Experimental Verification of Single Phase to Three Phase Converter Using an Active Buffer circuit with a Charge Circuit", IEEJ Industry Applications Society Conference, 1-124, 2010, pp. 587-590.

Ohnuma et al., "Circuit Configuration and Control Strategy of single-to-three Phase Power Converter with Active Buffer and Charge Circuit", IEEE, 4-057, 2010, Annual Meeting of the Institute of Electrical Engineers of Japan, pp. 95-96.

Ohnuma et al., "Comparison between a Boost Chopper and an Active Buffer as a Single to Three Phase Converter", IEEE, 4-042, Annual Meeting of the Institute of Electrical Engineers of Japan, 2011, pp. 80-81.

\* cited by examiner

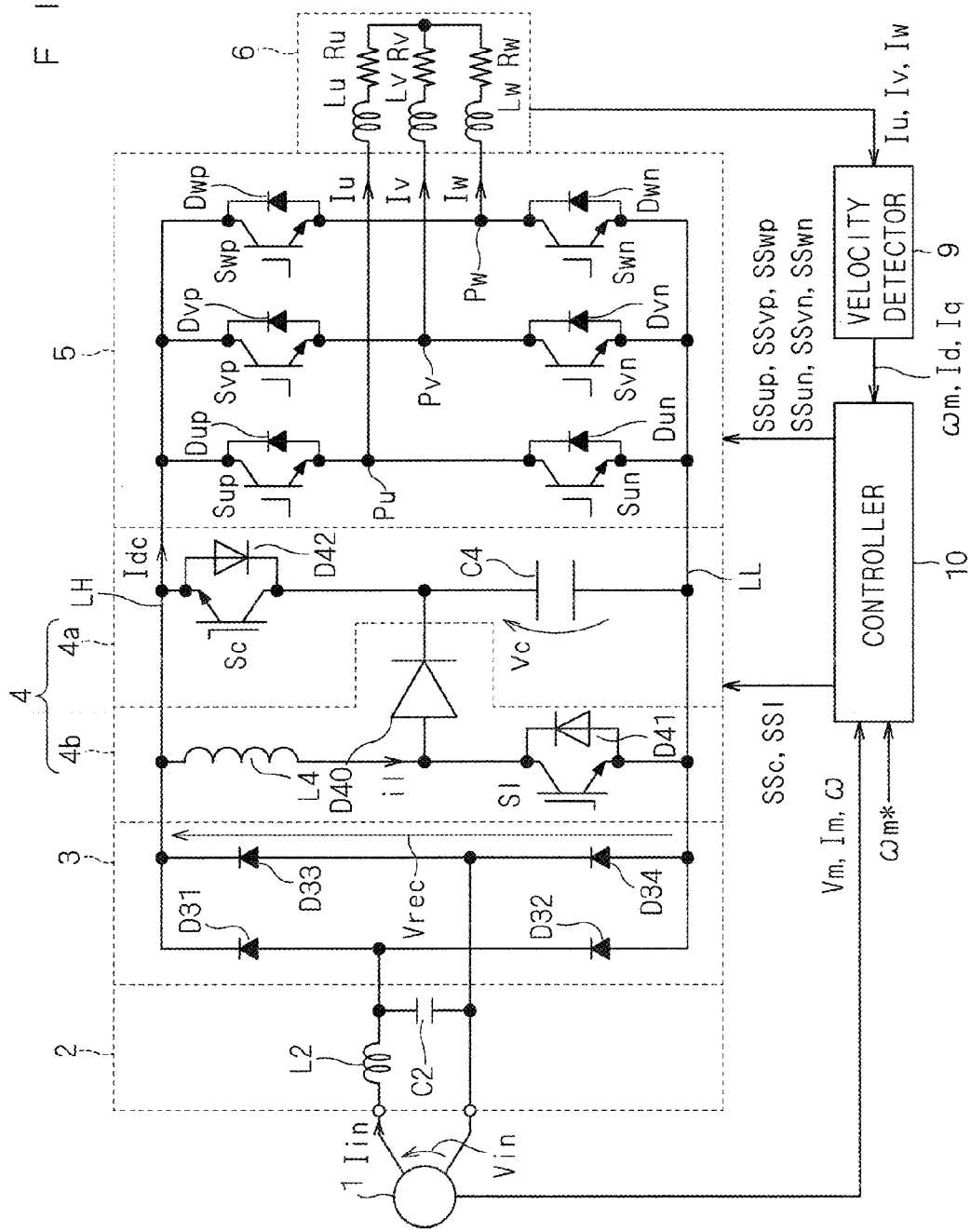
F I G . 1

F I G. 2
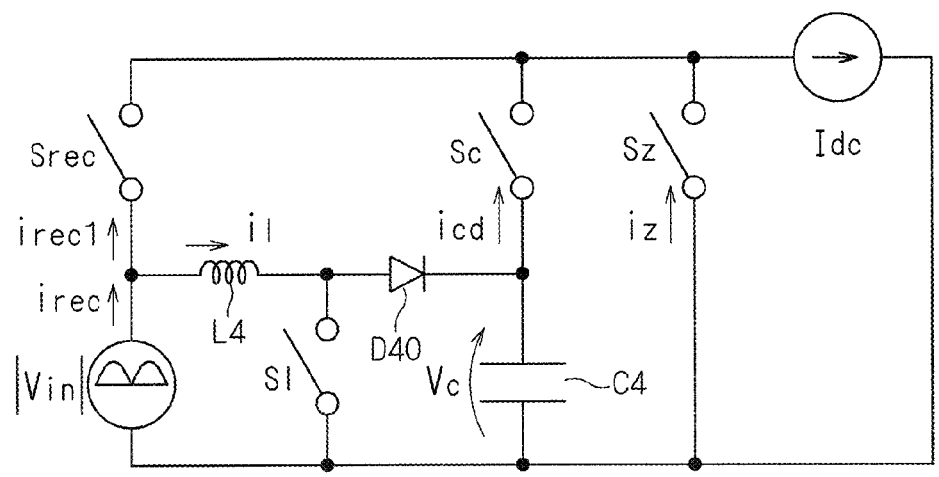

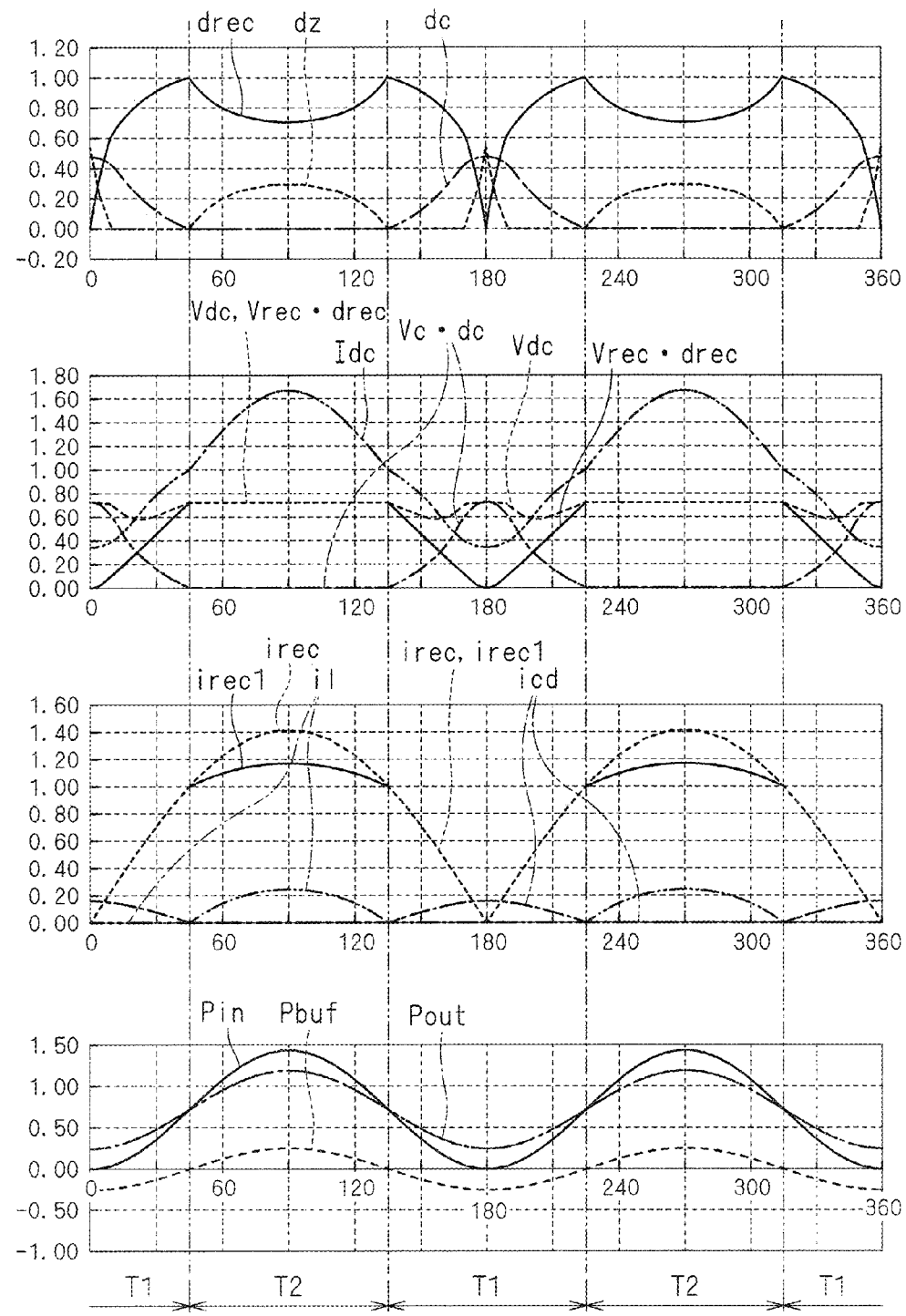
F I G . 5

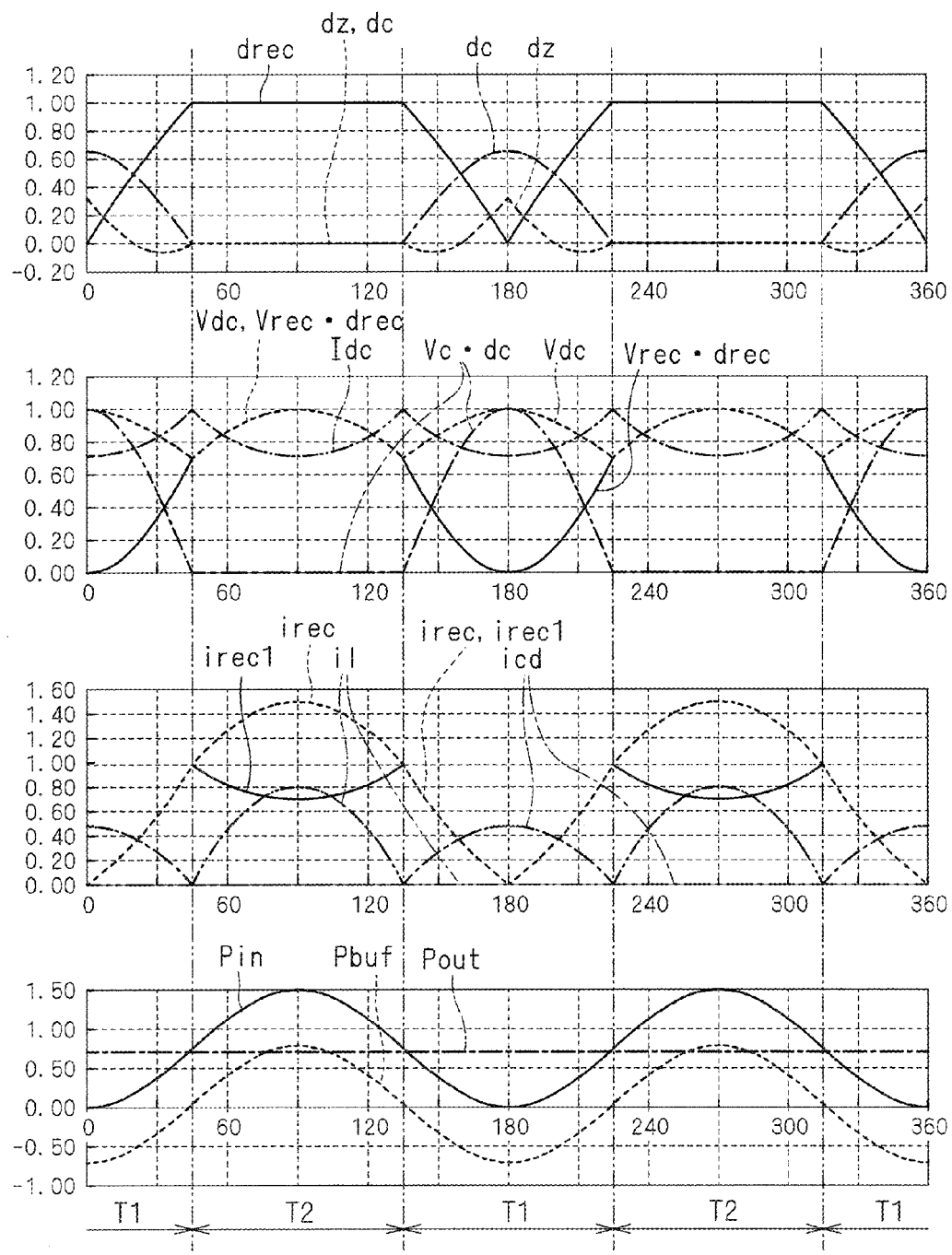
F I G . 6

CONTROL METHOD FOR DIRECT POWER CONVERTER

TECHNICAL FIELD

The present disclosure relates to a method for controlling a direct power converter.

BACKGROUND ART

Japanese Patent Application Laid-Open No. 2011-193678; Japanese Patent Application Laid-Open No. 2012-135184; Yoshiya Ohnuma, Jun-ichi Itoh, "Circuit Configuration and Control Strategy of single-to-three Phase Power Converter with Active Buffer and Charge Circuit", The 2010 Annual Meeting of the Institute of Electrical Engineers of Japan, No. 4-057 (2010); Yoshiya Ohnuma, Jun-ichi Itoh, "Experimental Verification of Single Phase to Three Phase Converter Using an Active Buffer circuit with a Charge Circuit", 2010 IEEJ Industry Applications Society Conference 1-124 (2010); and Yoshiya Ohnuma, Jun-ichi Itoh, "Comparison of Boost Chopper and Active Buffer as Single to Three Phase Converter", The 2011 Annual Meeting of the Institute of Electrical Engineers of Japan, No. 4-042 (2011) each describe a direct power converter. The direct power converter includes a diode rectifier, an inverter and a charge and discharge circuit.

A single-phase AC voltage is full-wave rectified by the diode rectifier, is thus output to a pair of DC power supply lines (a DC link).

The charge and discharge circuit is provided in the DC link and includes a buffer circuit and a boost circuit. The buffer circuit includes a switch and a capacitor connected in series with each other between the pair of DC power supply lines. The capacitor is discharged by conduction of the switch, thus providing power to the DC link.

The boost circuit boosts a rectified voltage from the diode rectifier to charge the capacitor. The charge and discharge circuit accordingly receives power from the DC link. The inverter receives a DC voltage of the DC link and converts it into an AC voltage to be output.

SUMMARY OF INVENTION

Problem to be Solved by the Invention

Unfortunately, the charge and discharge circuits proposed in these documents require high power capacity to compensate for the pulsating components of a single-phase AC voltage.

Typical electrolytic capacitors allow only a small ripple current, although they are inexpensive. Thus, the capacitor of the charge and discharge circuit proposed above is desirably, for example, a film capacitor or a laminated ceramic capacitor as in Yoshiya Ohnuma, Jun-ichi Itoh, "Comparison of Boost Chopper and Active Buffer as Single to Three Phase Converter", The 2011 Annual Meeting of the Institute of Electrical Engineers of Japan, No. 4-042 (2011). From such a point of view, it is difficult to configure a charge and discharge circuit inexpensively.

This application therefore has an object to provide a technique of reducing power provided/received between a charge and discharge circuit and a DC link to reduce power capacity required for the charge and discharge circuit.

Means to Solve the Problem

A method for controlling a direct power converter according to the present disclosure is a method for controlling a direct power converter including: a first power supply line (LH); a second power supply line (LL) which is applied with a potential lower than that of the first power supply line is applied; a converter (3) including an input side connected with a single-phase AC power supply (1, 2) and an output side connected with the first power supply line and the second power supply line, and performing single-phase full-wave rectification; a charge and discharge circuit (4) located between the first power supply line and the second power supply line; and an inverter (5) that converts a DC voltage between the first power supply line and the second power supply line into an AC voltage.

In the direct power converter, the charge and discharge circuit includes: a buffer circuit (4a) including a capacitor (C4) and a first switch (Sc, D42) connected in series with the capacitor at a side close to the first power supply line between the first power supply line and the second power supply line, and providing and receiving power between the first power supply line and the second power supply line; and a boost circuit (4b) that boosts a rectified voltage (Vrec) from the converter (3) to charge the capacitor.

The buffer circuit (4a) provides power to the first power supply line and the second power supply line in a first period (T1) in which a cosine value (cos(2ωt)) to a value (2ωt) of twice a phase angle (ωt) of an AC waveform output from the single-phase AC power supply (1, 2) is positive when the AC waveform is regarded as a sine value (sin(ωt)) of the phase angle (ωt); receives power from the first power supply line and the second power supply line in a second period (T2) in which the cosine value is negative.

In a first aspect of the method for controlling a direct power converter according to the present disclosure, the first switch (Sc, D42) is conductive at a discharge duty (dc) to discharge the capacitor (C4) in the first period, and is non-conductive (dc=0) in the second period (T2).

The converter (3) is conductive at a rectifying duty (drec), and both a sum, in the first period, of a product of the rectified voltage and the rectified duty and a product of a both-end voltage (Vc) of the capacitor and the discharge duty and a product, in the second period, of the rectified voltage and the rectifying duty take a product of a crest value (Vm) of an AC voltage (Vin) of the single-phase AC power supply, a first value ((1−k·cos(2ωt))/2), and a second value (Im/Idc).

Herein, the first value is half a value obtained by subtracting, from one, a product of a positive constant (k) less than one and the cosine value (cos(2 ωt)). The second value is a value obtained by dividing a virtual crest value (Im), which is √2-times an effective value of a first current (Iin) input to the converter by a second current (Idc) input to the inverter.

In a second aspect of the method for controlling a direct power converter according to the present disclosure, in the first aspect, the rectifying duty (drec) takes a smaller one of a product ((Im/Idc)·|sin(ωt)|) of the second value (Im/Idc) and an absolute value of the sine value (sin(ωt)) and a value (1−dc) obtained by subtracting the discharge duty (dc) from one in the first period (T1).

In a third aspect of the method for controlling a direct power converter according to the present disclosure, in the second aspect, the rectifying duty (drec) takes a value ((Im/Idc)·(1−k·cos(2ωt))/(2·|sin(ωt)|)) obtained by dividing a product of the second value (Im/Idc) and the first value ((1−k·cos(2ωt))/2) by the absolute value of the sine value (|sin(ωt)|) in the second period (T2).

In a fourth aspect of the method for controlling a direct power converter according to the present disclosure, in the second aspect, in the second period (T2), the rectifying duty (drec) takes a value one; and the second current (Idc) takes a value (Im·(1−k·cos(2ωt))/(2·|sin(ωt)|)) obtained by dividing a product of the virtual crest value (Im) of the first current and the first value ((1−k·cos(2ωt))/2) by the absolute value of the sine value (|sin(ωt)|).

In a fifth aspect of the method for controlling a direct power converter according to the present disclosure, in the fourth aspect, the second current (Idc) takes a value (Im·(1−k·cos(2ωt))/(2·|cos(ωt)|)) obtained by dividing a product of the virtual crest value (Im) of the first current and the first value ((1−k·cos(2ωt))/2) by an absolute value of a cosine value (|cos(ωt)|) of the phase angle (ωt) in the first period (T1).

For example, a value of √2-times an absolute value (Im/√2), which is taken by the first current at a boundary between the first period and the second period, is adopted as the virtual crest value (Im) of the first current.

Alternatively, for example, the boost circuit (4b) includes: a diode (D40) including a cathode and an anode that is connected between the first switch (Sc, D42) and the capacitor (C4); a reactor (L4) connected between the first power supply line (LH) and the anode, through which a current input to the boost circuit flows; and a second switch (Sl, D41) connected between the second power supply line (LL) and the anode. In the second period (T2), the second switch of the boost circuit is controlled to control a current (il) flowing through the reactor (L4).

Effects of the Invention

According to the first aspect of the method for controlling a direct power converter of the present disclosure, the power provided/received by the buffer circuit is reduced, thereby reducing a power capacity required for the buffer circuit.

According to the second aspect of the method for controlling a direct power converter of the present disclosure, a duty ratio at which a zero-phase current always flows in the inverter irrespective of the voltage output by the inverter is prevented from being numerically negative.

According to the third aspect of the method for controlling a direct power converter of the present disclosure, an average value of a virtual DC voltage can be made constant in a period in which the inverter is capable of power conversion.

According to the fourth aspect of the method for controlling a direct power converter of the present disclosure, a voltage utilization ratio is improved, and a maximum value of the current input to the invertor is reduced.

According to the fifth aspect of the method for controlling a direct power converter of the present disclosure, the voltage utilization ratio is improved.

The object, features, aspects and advantages of the present disclosure will become more apparent from the following detailed description and the attached drawings.

BRIEF DESCRIPTION OF DRAWINGS

FIG. 1 is a block diagram showing a configuration of a direct power converter to which a control method described in an embodiment is applied;

FIG. 2 is a circuit diagram showing an equivalent circuit of a circuit shown in FIG. 1;

FIG. 5 is a graph showing the operation of the direct power converter shown in FIG. 1 in a corrected first setting;

FIGS. 6 and 7 are graphs showing the operation of the direct power converter shown in FIG. 1 in a second setting;

DESCRIPTION OF EMBODIMENTS

A. Configuration of Direct Power Converter

Figure 3:
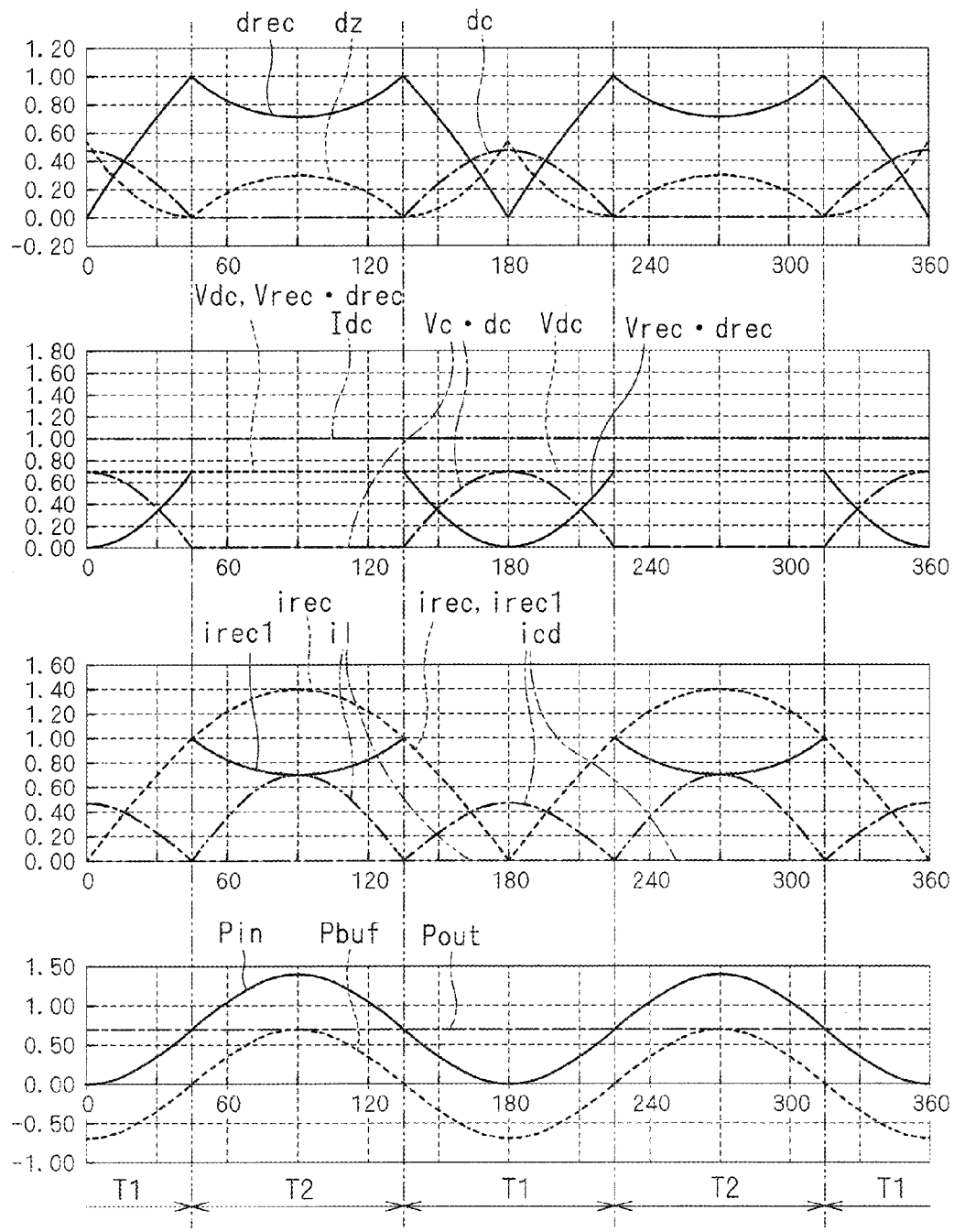
FIG. 3 is a graph showing an operation of the direct power converter shown in FIG. 1 in a basic technique.

FIG. 1 is a block diagram showing a configuration of a direct power converter to which a control method described in this embodiment is applied. The direct power converter includes a converter 3, a charge and discharge circuit 4 and an inverter 5.

The converter 3 is connected with a single-phase AC power supply 1 via, for example, a filter 2. The filter 2 includes a reactor L2 and a capacitor C2. The reactor L2 is provided between the converter 3 and one of two output terminals of the single-phase AC power supply 1. The capacitor C2 is provided between the two output terminals of the single-phase AC power supply 1. The filter 2 removes high frequency components of a current. The filter 2 may be omitted. For the sake of brevity, the following description will be made ignoring the function of the filter 2.

The converter 3 uses a diode bridge, for example, and includes diodes D31 to D34. The diodes D31 to D34, which constitute a bridge circuit, convert a single-phase AC voltage Vin, which is an input voltage input from the single-phase AC power supply 1, by single-phase full-wave rectification and output it across DC power supply lines LH and LL (which form a so-called DC link). A higher potential is applied to the DC power supply line LH than to the DC power supply line LL. An input current Iin flows into the converter 3 from the single-phase AC power supply 1.

The charge and discharge circuit 4 includes a buffer circuit 4a and a boost circuit 4b. The buffer circuit 4a includes a capacitor C4 and provides and receives power between the DC power supply lines LH and LL. The boost circuit 4b boosts the rectified voltage Vrec to charge the capacitor C4.

The buffer circuit 4a further includes a transistor (herein an insulated gate bipolar transistor, abbreviated as "IGBT" below) Sc connected in antiparallel with a diode D42. The transistor Sc is connected in series with the capacitor C4 at the side close to the DC power supply line LH between the DC power supply lines LH and LL. Herein, being connected in antiparallel refers to being connected in parallel, with forward directions being opposite to each other. Specifically, the forward direction of the transistor Sc is a direction from the DC power supply line LL toward the DC power supply line LH, and the forward direction of the diode D42 is a direction from the DC power supply line LH toward the DC power supply line LL. The transistor Sc and the diode D42 can be collectively regarded as a switch element (first switch).

The boost circuit 4b includes, for example, a diode D40, a reactor L4, and a transistor (herein, IGBT) Sl. The diode D40 has a cathode and an anode, and the cathode is connected between the first switch and the capacitor C4. This configuration is known as a so-called boost chopper.

The reactor L4 is connected between the DC power supply line LH and the anode of the diode D40. The transistor Sl is connected between the DC power supply line LL and the anode of the diode D40. The transistor Sl is connected in antiparallel with the diode D41, which are collectively regarded as a switch element (second switch).

The capacitor C4 is charged by the boost circuit 4b, thus generating a both-end voltage Vc higher than the rectified voltage Vrec. Specifically, a current is caused to flow from the DC power supply line LH to the DC power supply line LL via the second switch to store energy in the reactor L4, and then, the second switch is turned off to store the energy in the capacitor C4 via the diode D40.

The both-end voltage Vc is higher than the rectified voltage Vrec, and thus, basically no current flows through the diode D42. Thus, the conduction/non-conduction of the first switch solely depends on that of the transistor Sc. Hereinafter, accordingly, not only the transistor Sc but also the first switch including the transistor Sc and the diode D42 may be referred to as a switch Sc.

The power supply line LH is higher than the DC power supply line LL in potential, and thus, basically no current flows through the diode D41. Thus, the conduction/non-conduction of the second switch solely depends on that of the transistor Sl. Hereinafter, accordingly, not only the transistor Sl but also the second switch including the transistor Sl and the diode D41 may be referred to as a switch Sl.

The inverter 5 converts a DC voltage between the DC power supply lines LH and LL into an AC voltage and then outputs it to output terminals Pu, Pv and Pw. The inverter 5 includes six switching elements Sup, Svp, Swp, Sun, Svn and Swn. The switching elements Sup, Svp and Swp are respectively connected between the output terminals Pu, Pv and Pw and the DC power supply line LH. The switching elements Sun, Svn and Swn are respectively connected between the output terminals Pu, Pv and Pw and the DC power supply line LL. The inverter 5 constitutes a so-called voltage source inverter and includes six diodes Dup, Dvp, Dwp, Dun, Dvn and Dwn.

The diodes Dup, Dvp, Dwp, Dun, Dvn and Dwn are disposed, with their cathodes toward the DC power supply line LH and their anodes toward the DC power supply line LL. The diode Dup is connected in parallel with the switching element Sup between the output terminal Pu and the DC power supply line LH. Similarly, the diodes Dvp, Dwp, Dun, Dvn and Dwn are respectively connected in parallel with the switching elements Svp, Swp, Sun, Svn and Swn.

For example, the switching elements Sup, Svp, Swp, Sun, Svn and Swn may use IGBTs.

An inductive load 6 is a rotating machine, for example, is illustrated as an equivalent circuit indicative of an inductive load. Specifically, a reactor Lu and a resistor Ru are connected in series with each other, and one end of the series body is connected with the output terminal Pu. This holds true for a reactor Lv and a resistor Rv and for a reactor Lw and a resistor Rw. The other ends of the series bodies are connected with each other.

B. Control Method (b-1) Basic Concept of Power Reduction

An instantaneous input power Pin input to the converter 3 is expressed by a formula (1) with an input power factor being one, where a crest value Vm and a power supply angular velocity ω of the single-phase AC voltage Vin, a crest value Im of the input current Iin and a time t are introduced. A product ωt of the power supply angular velocity ω and the time t represents a phase angle of the single-phase AC voltage Vin. An AC waveform is regarded as a product of a sine value of the phase angle ωt of the AC waveform and a crest value.

$$Pin = Vm \cdot Im \cdot \sin^2(\omega t) \quad (1)$$
$$= \frac{1}{2} Vm \cdot Im - \frac{1}{2} Vm \cdot Im \cdot \cos(2\omega t)$$

The second term of the right-hand side of the formula (1) represents power pulsations. In conventional techniques, to cancel out such power pulsations, the buffer circuit 4a provides and receives, between the DC power supply lines LH and LL therewith, the power that is the same as the second term of the right-hand side of the formula (1) in a value but different in a polarity. The power capacity of the charge and discharge circuit 4 therefore needs to be selected so as to be greater than or equal to the second term of the right-hand side of the formula (1).

Description will thus be made on which technique should be used for allowing to reduce the power (hereinafter referred to as "instantaneously provided/received power Pbuf") provided/received as described above in order to reduce the power capacity of the charge and discharge circuit 4.

Needless to say, setting the instantaneously provided/received power Pbuf to completely zero is not desirable because the power input to the inverter 5 pulsates with the second term of the right-hand side of the formula (1) and, in the first place, reducing the power capacity of the charge and discharge circuit 4 is not required. A positive constant k less than one is thus introduced (a value (1−k) is accordingly also a positive constant less than one), to determine the instantaneously provided/received power Pbuf by a formula (2). In other words, a characteristic approach for achieving such an instantaneously provided/received power Pbuf will be described below.

$$Pbuf = \frac{1}{2} Vm \cdot Im \cdot \cos(2\omega t) \cdot (1-k) \quad (2)$$

That is to say, the instantaneously provided/received power Pbuf is represented as a product of a DC component (Vm·Im/2) of the instantaneous power input from the single-phase AC power supply 1 (or further via the filter 2, which holds true for the description below), a cosine value cos (2ωt) to a value (2ωt) of twice a phase angle ωt and a constant (1−k).

The instantaneously provided/received power Pbuf specifically takes a positive value in a period (hereinafter a "providing period") in which the phase angle ωt of the single-phase AC voltage is 0 or more and π/4 or less, 3π/4 or more and 5π/4 or less, or 7π/4 or more and 2π or less, and takes a negative value in any other period (hereinafter a "receiving period"). That is to say, the buffer circuit 4a provides an absolute value of the instantaneously provided/received power Pbuf to the DC power supply lines LH and LL in the providing period and receives the absolute value of the instantaneously provided/received power Pbuf from the DC power supply lines LH and LL in the receiving period. The power pulsations are accordingly canceled out.

The single-phase AC voltage Vin is represented as Vm·sin (ωt), and thus, to put the above range in another way, the charge and discharge circuit 4 outputs positive power when the absolute value of the single-phase AC voltage Vin is smaller than a value of $1/\sqrt{2}$-times the crest value Vm and outputs negative power when the absolute value is greater than the value of $1/\sqrt{2}$-times the crest value Vm.

FIG. 2 shows an equivalent circuit of the circuit shown in FIG. 1 described with reference to Japanese Patent Application Laid-Open No. 2011-193678 and Yoshiya Ohnuma, Jun-ichi Itoh, "Circuit Configuration and Control Strategy of single-to-three Phase Power Converter with Active Buffer and Charge Circuit", The 2010 Annual Meeting of the Institute of Electrical Engineers of Japan, No. 4-057 (2010) (hereinafter referred to as a "first document group"). In the equivalent circuit shown in FIG. 2, a current irec1 flowing from the converter 3 to the inverter 5 is equivalently expressed as a current irec1 flowing through a switch Srec when the switch Srec is conductive. Similarly, the discharge current of the capacitor C4 is equivalently shown as a current icd through the switch Sc when the switch Sc is conductive. Also, a current, which flows through the inductive load 6 via the inverter 5 when the output terminals Pu, Pv and Pw are connected in common to any one of the DC power supply lines LH and LL in the inverter 5, is equivalently expressed as a zero-phase current iz flowing through a switch Sz when the switch Sz is conductive. FIG. 2 also shows the reactor L4, the diode D40, and the switch Sl constituting the boost circuit 4b, and additionally shows a current il flowing through the reactor L4.

Duty ratios drec, dc and dz at which the switches Srec, Sc and Sz are respectively conductive and a DC current Idc input to the inverter 5 are introduced in the equivalent circuit thus obtained, and accordingly, a formula (3) holds.

$$\begin{bmatrix} irec \\ icd \\ iz \end{bmatrix} = \begin{bmatrix} drec & 1 \\ dc & 0 \\ dz & 0 \end{bmatrix} \cdot \begin{bmatrix} Idc \\ il \end{bmatrix} \quad (3)$$

The currents irec1, icd and iz are obtained by multiplying the current Idc respectively by the duty ratios drec, dc and dz, and thus, these are respectively average values in the switching cycles of the switches Srec, Sc and Sz. The current it is also an average value in the switching cycle of the switch Sl.

The current Idc is the sum of the currents irec1, icd, and iz flowing through the respective switches Srec, Sc and Sz, and thus, a formula (4) holds, where $0 \leq drec \leq 1$, $0 \leq dc \leq 1$ and $0 \leq dz \leq 1$.

$$drec+dc+dz=1 \quad (4)$$

The duty ratios drec, dc and dz are thus considered as current distribution ratios of the current Idc to the respective currents irec1, icd and iz. The duty ratio drec is a duty ratio at which a period, in which the converter 3 is connected with the DC power supply lines LH and LL and allows a current to flow into the inverter 5, is set, and thus may be referred to as a rectifying duty drec below. The duty ratio dc is a duty ratio at which the capacitor C4 is discharged, and thus may be referred to as a discharge duty dc below. The duty ratio dz is a duty ratio at which the zero-phase current iz always flows in the inverter 5 irrespective of the voltage output by the inverter 5, and thus may be referred to as a zero duty dz below.

The inverter 5 cannot utilize a DC voltage between the DC power supply lines LH and LL in the period in which a zero-phase current iz flows. Of the DC voltage between the DC power supply lines LH and LL, thus, a virtual DC voltage (hereinafter referred to as a "virtual DC voltage") Vdc in a period in which the inverter 5 is capable of power conversion is conceivable as a formula (5). The virtual DC voltage Vdc can be regarded as a voltage applied across the DC power supply lines LH and LL as an average of the maximum values of the voltages that can be output by the inverter 5, with respect to the cycle of controlling switching of the switches Sc and Sl and the inverter 5.

$$Vdc = Vrec \cdot drec + Vc \cdot dc + 0 \cdot dz$$

where $Vrec = Vm \cdot |\sin(\omega t)|$ \quad (5)

Hereinafter, a ratio R (=Vdc/Vm) of a virtual DC voltage Vdc to a crest value Vm is referred to as a voltage utilization ratio.

(b-2) First Setting of Duty Ratio for Maximizing Voltage Utilization Ratio R and its Correction According to the first document group, the rectifying duty drec and the discharge duty dc for maximizing the voltage utilization ratio R are each set in the providing period and the receiving period by the formulas (6) and (7), respectively. As suggested in Japanese Patent Application Laid-Open No. 2011-193678, however, this is the setting that maximizes the voltage utilization ratio R for the virtual DC voltage Vdc that is constant. The voltage utilization ratio R is $(1/\sqrt{2})$ in this case. In the receiving period, dc=0, so that the switch Sc is not conductive. In the providing period, the capacitor C4 is not charged, so that the current il does not flow.

$$\left. \begin{array}{l} drec = \sqrt{2}\,|\sin(\omega t)| \\ dc = \dfrac{Vm}{Vc} \cdot \dfrac{\cos(2\omega t)}{\sqrt{2}} \end{array} \right\} \quad (6)$$

$$\left. \begin{array}{l} drec = \dfrac{1}{\sqrt{2}\,|\sin(\omega t)|} \\ dc = 0 \end{array} \right\} \quad (7)$$

In this "first setting" and a "second setting", the current Idc input to the inverter 5 is caused to pulsate to obtain an instantaneously provided/received power Pbuf that satisfies the formula (2).

Specifically, the current Idc that satisfies a formula (8) is caused to be input to the inverter 5. The control of the converter 5 for satisfying the formula (8) can be achieved by controlling a current command value. The control of the current command value will be described below.

$$Idc = \frac{Vm \cdot Im}{2Vdc}(1 - k \cdot \cos(2\omega t)) \quad (8)$$

The power input to the inverter 5, that is, instantaneous output power Pout consumed by the inverter 5 is obtained as a product of the current Idc and the virtual DC voltage Vdc, which is obtained by a formula (9).

$$\begin{aligned} Pout &= Vdc \cdot Idc \\ &= \frac{Vm \cdot Im}{2}(1 - k \cdot \cos(2\omega t)) \end{aligned} \quad (9)$$

The instantaneous output power Pout is represented as a product of a first value $(1-k \cdot \cos(2\omega t))/2$, which is half a value obtained by subtracting, from one, a product of the constant k and the cosine value (cos(2ωt)), and the crest values Im and Vm.

A difference between the formulas (9) and (1) is thus obtained as being expressed by a formula (10), which matches the formula (2). The validity of setting the current Idc by the formula (8) has therefore been described.

$$Pout - Pin = \frac{Vm \cdot Im}{2}[(1 - k \cdot \cos(2\omega t)) - 2\sin^2(\omega t)] \quad (10)$$
$$= \frac{Vm \cdot Im}{2} \cdot \cos(2\omega t) \cdot (1 - k)$$

In the formula (9), the virtual DC voltage Vdc is represented as a product of a second value Im/Idc, which is a value obtained by dividing the crest value Im by the current Idc, the first value (1−k·cos(2ωt))/2 and the crest value Vm. Accordingly, the formula (5) shows that the formula (2) is achieved by the setting described below:

(i) in the providing period, a sum of a product Vrec·drec of the rectified voltage Vrec and the rectifying duty drec and a product Vc·dc of the both-end voltage Vc and discharge duty do of the capacitor takes a product of the crest value Vm, the first value (1−k·cos(2ωt))/2 and the second value Im/Idc; and (ii) in the receiving period, the product Vrec·drec of the rectified voltage Vrec and the rectifying duty drec takes the product of the crest value Vm, the first value (1−k·cos (2ωt))/2 and the second value Im/Idc.

In view of dc=0 in the receiving period, the above setting (i) may include the above setting (ii).

In the providing period, the instantaneously provided/received power Pbuf is provided from the capacitor C4 to the DC link, so that the power represented as a product of the current icd flowing through the capacitor C4 and the both-end voltage Vc is equal to the right-hand side of the formula (2). Since the current icd is represented as a product of the current Icd and the discharge duty dc, a formula (11) described below holds.

$$dc = \frac{Pbuf}{Vc \cdot Idc} = \frac{Vm}{Vc} \cdot \frac{Im}{Idc} \cdot \frac{(1-k) \cdot \cos(2\omega t)}{2} \quad (11)$$

That is to say, in the providing period, the discharge duty de is represented as half a value of a product of a voltage ratio Vm/Vc obtained by dividing the crest value Vm by the both-end voltage Vc, the second value Im/Idc, the value (1−k) and the cosine value cos (2ωt).

With regard to the above second value Im/Idc, in view of the formula (8), a formula (12), which indicates that the discharge duty dc is determined by the phase angle ωt, the constant k, a ratio α and the voltage utilization ratio R without depending upon the current Idc, is obtained. Herein, the ratio α is equal to Vc/Vm. Normally, the ratio α is considered to be approximately constant, so that it is revealed that when the constant k is set, the discharge duty dc can be set in accordance with a desired voltage utilization ratio R.

$$dc = \frac{R}{\alpha} \cdot \frac{(1-k) \cdot \cos(2\omega t)}{1 - k \cdot \cos(2\omega t)} \quad (12)$$

Meanwhile, in the receiving period, the current il is set as being expressed by a formula (13). The power stored in the charge and discharge circuit 4 in the receiving period is accordingly calculated as a formula (14), and is equal in an absolute value to and a polarity opposite to those of the formula (2) expressing the instantaneously provided/received power Pbuf. The validity of setting the current il by the formula (13) is therefore revealed.

$$il = Im \cdot \left[|\sin(\omega t)| - \frac{1 - k \cdot \cos(2\omega t)}{2|\sin(\omega t)|}\right] \quad (13)$$

$$Vrec \cdot il = Vm|\sin(\omega t)| \cdot Im \cdot \left[|\sin(\omega t)| - \frac{1 - k \cdot \cos(2\omega t)}{2|\sin(\omega t)|}\right] \quad (14)$$
$$= Vm \cdot Im \cdot \left[\sin^2(\omega t) - \frac{1 - k \cdot \cos(2\omega t)}{2}\right]$$
$$= \frac{1}{2} Vm \cdot Im \cdot [-(1 - k) \cdot \cos(2\omega t)]$$

A specific operation of the boost circuit 4b for satisfying the formula (13) can be achieved easily based on the first document group.

In performing such a control, a condition of the rectifying duty drec necessary for allowing the input current Iin to have the sine wave is considered. The current irec output by the converter 3 is the absolute value of the input current Iin, thereby being expressed as irec=Im|sin(ωt)|.

Since the current irec1 is equal to the product drec·Idc, and in the providing period, as the current il is set to zero, the current irec1 is equal to the current irec. A formula (15) described below therefore holds as the condition for allowing the input current Iin to have the sine wave in the providing period.

$$drec = \frac{irec1}{Idc} = \frac{irec}{Idc} = \frac{Im}{Idc} \cdot |\sin(\omega t)| \quad (15)$$

That is to say, the rectifying duty drec is represented as a product of the second value Im/Idc and the absolute value |sin(ωt)|.

With regard to the second value Im/Idc, in view of the formula (8), a formula (16), which indicates that the rectifying duty drec is determined by the phase angle ωt, the constant k and the voltage utilization ratio R without depending upon the current Idc, is obtained. It is revealed that when the constant k is set, the rectifying duty drec can be set in accordance with a desired voltage utilization ratio R.

$$drec = 2R \cdot \frac{|\sin(\omega t)|}{1 - k \cdot \cos(2\omega t)} \quad (16)$$

Since the current il, in the receiving period, is expressed by the formula (13) and the current irec is a sum of irec1 and il, a formula (17) described below holds.

$$irec1 = irec - il = Im \cdot \frac{1 - k \cdot \cos(2\omega t)}{2 \cdot |\sin(\omega t)|} \quad (17)$$

Since the current irec1 is equal to the product drec·Idc, in view of the formula (8), a formula (18), which indicates that the rectifying duty drec is determined by the phase angle ωt and the voltage utilization ratio R without depending upon the constant k and the current Idc, is obtained. It is revealed that the rectifying duty drec can be set in accordance with a desired voltage utilization ratio R without upon the constant k.

$$drec = \frac{irec1}{Idc} = \frac{Im}{Idc} \cdot \frac{1 - k \cdot \cos(2\omega t)}{2 \cdot |\sin(\omega t)|} \quad (18)$$
$$= \frac{2Vdc}{Vm} \cdot \frac{1}{2 \cdot |\sin(\omega t)|} = \frac{R}{|\sin(\omega t)|}$$

At the phase angle ωt at the boundary between the receiving period and the providing period, $|\sin(\omega t)|=1/\sqrt{2}$ holds, and in this case, the formulas (16) and (18) match each other. Since $\cos(2\omega t)=0$ holds at this angle phase ωt, so that also in the formula (16), drec=1 and $R=1/\sqrt{2}$ hold without depending upon the constant k.

Since dc=0 holds in the receiving period, the formula (18) satisfies the formula (5) without a limitation of the voltage utilization ratio R and the constant k. In other words, the voltage utilization ratio R can continue to take, in the receiving period, the value $1/\sqrt{2}$ at the boundary between the receiving period and the providing period without depending upon the constant k.

In the providing period, a formula (19) holds using the discharge duty dc expressed by the formula (12) and the rectifying duty drec expressed by the formula (16).

$$Vc \cdot dc + Vrec \cdot drec = Vm \cdot R \cdot \frac{(1-k) \cdot \cos(2\omega t) + 2 \cdot \sin^2(\omega t)}{1 - k \cdot \cos(2\omega t)} \quad (19)$$
$$= Vm \cdot R$$

It is revealed that a leftmost-hand side of the formula (19) is equal to the virtual DC voltage Vdc, and a rightmost-hand side of the formula (19) is equal to the virtual DC voltage Vdc in accordance with the definition of the voltage utilization ratio R. Accordingly, the formula (19) holds without depending upon the voltage utilization ratio R and the constant k. Accordingly, also in the providing period, the voltage utilization ratio R can take the value $1/\sqrt{2}$ at the boundary between the receiving period and the providing period without depending upon the constant k. The above settings of the duties can be performed easily based on the first document group.

Figure 4:
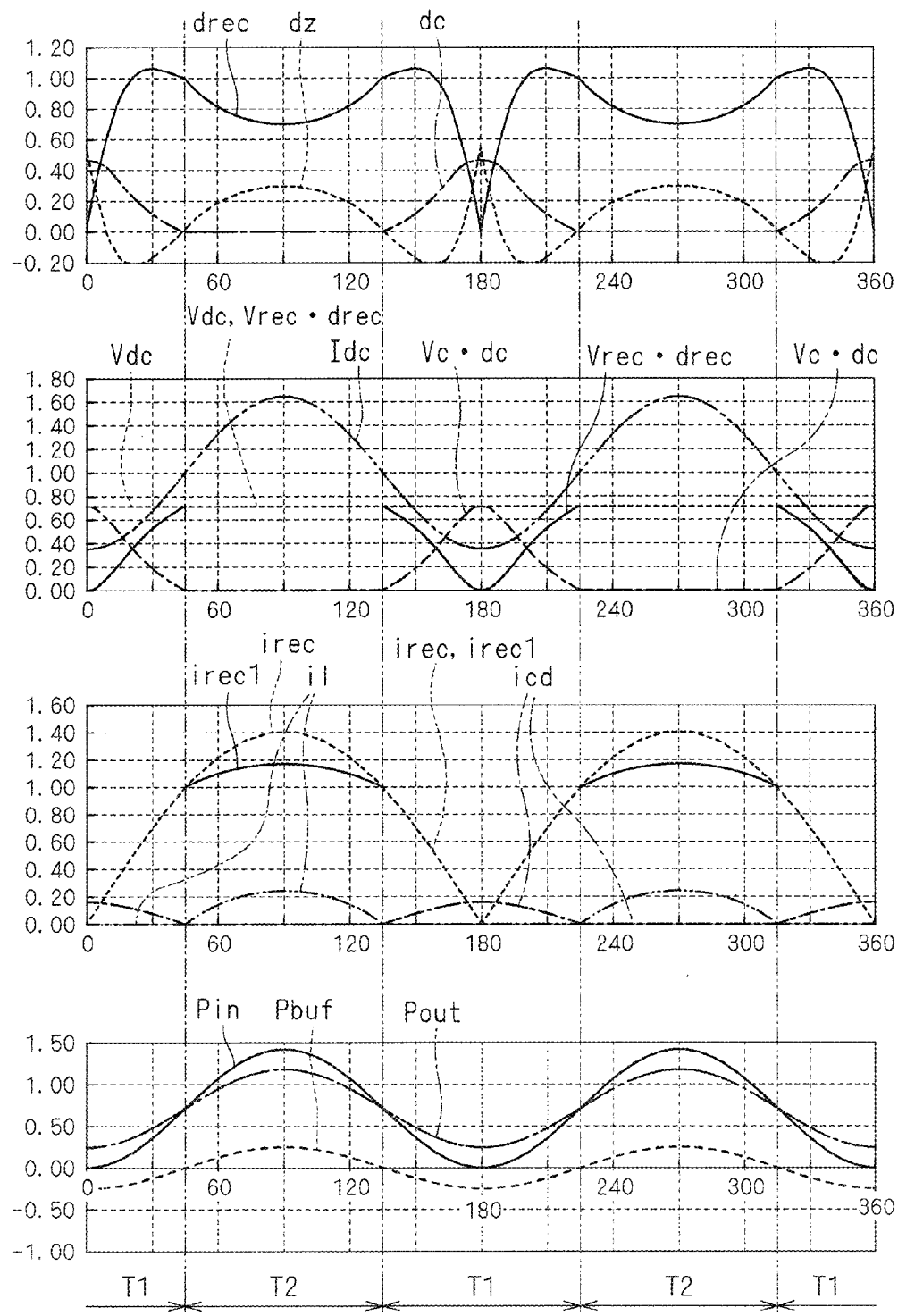
FIG. 4 is a graph showing the operation of the direct power converter shown in FIG. 1 in a first setting.

FIGS. 3 and 4 are graphs each showing the operation of the direct power converter shown in FIG. 1. FIG. 3 shows the case where the constant k is temporarily set to zero and corresponds to the technique disclosed in Japanese Patent Application Laid-Open No. 2011-193678 (hereinafter referred to "the basic technique"). FIG. 4 shows the case where the setting is made such that k=2/3. An equal voltage ratio α is set in FIGS. 3 and 4.

In both of FIGS. 3 and 4, the uppermost tier shows the duties ratio drec, dc and dz, the second tier from the top shows the voltages Vrec·drec and Vc·dc, the virtual DC voltage Vdc which is constituted thereby (see the formula (5)), and the current Idc, the third tier from the top shows the currents irec, icd, il and irec1, and the lowermost tier shows the instantaneous powers Pin, Pout and Pbuf. Symbols T1 and T2 respectively represent the providing period and the receiving period.

In both of FIGS. 3 and 4, the horizontal axis represents the phase angle ωt with "degree" as the unit. The currents Idc, irec, icd, il and irec1 are converted with the crest value Im being $\sqrt{2}$. The voltages Vrec, drec and Vc·dc are converted with the crest value Vm being one. The instantaneous powers Pin, Pout and Pbuf are each obtained as the product of the voltage and current converted as described above. The current il is zero in the providing period T1, and accordingly, the current irec1 matches the current irec; dc=0 in the receiving period T2, and accordingly, the voltage Vrec·drec matches the virtual DC voltage Vdc.

In the receiving period, the discharge duty de is set to zero, and the rectifying duty drec does not depend upon the constant k as expressed by the formula (18). The duty ratios drec, dc and dz are common in FIGS. 3 and 4 in the receiving period. Accordingly, the voltages Vrec·drec, Vc·dc and the virtual DC voltage Vdc which is constituted thereby are also common in FIGS. 3 and 4.

The current Idc is expressed by the formula (8), and accordingly, the basic technique shown in FIG. 3 (i.e., zero is temporarily adopted as the constant k) greatly differs from the case shown in FIG. 4 (herein, k=2/3).

The current il is expressed by the formula (13). The cosine value cos(2ωt) is negative in the receiving period in which the current il flows. Accordingly, the numerator of the second term in the parenthesis in the right-hand side of the formula (13) becomes greater with a greater constant k. Accordingly, the current il is reduced as the constant k becomes greater, and the current il is reduced in the technique to which the constant k is introduced compared to the basic technique.

The current icd takes a value Idc·dc. The cosine value cos(2ωt) is positive in the providing period in which the current icd flows. Accordingly, when the formulas (6) and (11), to which Im=$\sqrt{2}$ is assigned, are compared, a ratio between the current icd in a case where k is temporarily set to zero and the current icd in a case of 0<k<1 is 1:(1−k). Accordingly, the current icd is reduced as the constant k becomes greater. That is to say, similarly to the current il, thus, the current icd is reduced in the technique to which the constant k is introduced compared to the basic technique.

Such reductions in the currents il and icd are desirable from the viewpoints of reducing power capacities required for the reactor L4 and the capacitor C4 employed in the charge and discharge circuit 4, scale and cost.

It is also revealed that although the instantaneous output power Pout pulsates in the technique to which the constant k is introduced, the instantaneously provided/received power Pbuf is reduced compared to the basic technique.

However, as can been seen from the zero duty dz shown in FIG. 4, in accordance with such a setting, a condition of dz<0 occurs numerically in the providing period T1. That is to say, the setting which satisfies all of the formulas (11), (12), (15) and (16) formally satisfies the formula (4), but consists a setting of an operation that cannot be achieved in the providing period T1.

In order to achieve dz≥0 in the providing period T1, the setting of the rectifying duty drec is corrected as follows while maintaining the formulas (11) and (12) for setting the discharge duty dc:

(iii) in the providing period, the rectifying duty drec takes a smaller one of (Im/Idc)·|sin(ωt)| expressed by the formula (15) (or the formula (16)) and the value (1−dc) obtained by subtracting the discharge duty dc, expressed by the formula (12), from one.

Accordingly, the formula (4) can be satisfied and dz≥0 can be achieved. As described above, even when the rectifying duty drec in the providing period is corrected, the reduction in the currents il and icd is not prevented. This is because it is the receiving period when the current il flows, and although the current icd flows in the providing period, the discharge duty de is not corrected.

As indicated in the description of the formulas (11) and (14), the instantaneously provided/received power Pbuf is equal to the product of the current icd and the both-end voltage Vc and the product of the current il and the rectified voltage Vrec. Even with the correction of the above (iii), the currents icd and il are not corrected and the both-end voltage Vc and the rectified voltage Vrec are maintained, so that the instantaneously provided/received power Pbuf is also maintained. Accordingly, the formula (10) is also maintained, and then, the formula (9) is also maintained. In other words, it is revealed that the above correction (iii) can be introduced without preventing the above settings (i) and (ii).

As a matter of course, since the period in which the rectifying duty drec takes the value smaller than a value expressed by the formula (15) occurs, the voltage utilization ratio R is reduced in the above period, and the virtual DC voltage Vdc cannot be made constant. Since the formula (15) is not satisfied, the current irec is distorted from the sine wave. Since the current irec appears as the absolute value of the input current Iin, as opposed to the cased shown in FIGS. 3 and 4, the input current Iin differs from a sin wave.

Accordingly, the crest value Im should be regarded as a crest value of the current having a sine wave which has an effective value of the input current Iin (i.e., a time average of the square of the input current Iin) as its effective value (i.e., $\sqrt{2}$ times the effective value). The crest value Im is therefore treated as the virtual crest value Im hereinafter. As a matter of course, when the input current Iin has the sine wave, the virtual crest value Im means the crest value in the ordinary sense.

In the formula (17), regardless of the constant k, when il=0 and cos(2ωt)=0, |sin(ωt)|=1/$\sqrt{2}$ and the current irec takes a value Im/$\sqrt{2}$. Accordingly, the virtual crest value Im can be regarded as being $\sqrt{2}$ times a value which the current irec (i.e., an absolute value of the input current Iin) takes when the phase angle ωt is π/4 and 3π/4 (i.e., a boundary between the providing period and the receiving period).

FIG. 5 is a graph showing the operation of the direct power converter when the rectifying duty drec corrected in the above-described manner is employed, and its setting is equal to FIG. 4 except for the rectifying duty drec and the zero duty dz.

In the period in which the zero duty dz is negative in FIG. 4, the zero duty dz is zero, the virtual DC voltage Vdc gets lower than 1/$\sqrt{2}$, and the current irec is distorted from the sine wave in FIG. 5.

As a matter of course, it is desirable to shorten the period in which the current irec is distorted from the sine wave as described above. That is to say, it is desirable that the sum of the duty ratios dc and drec expressed by the formulas (12) and (16) is small enough not to be greater than one. When a desired value is set as the constant k and the voltage utilization ratio R, a parameter which can be changed is the ratio α, so that the rectifying duty drec cannot be corrected, however, it is revealed that the discharge duty dc can be made smaller by selecting the ratio α to be larger. When the crest value Vm is fixed, the ratio α becomes greater with a greater both-end voltage Vc, so that the period in which the current irec is, accordingly the input current Iin also is, distorted from the sine wave can be reduced as the both-end voltage Vc becomes greater.

(b-3) Second Setting of Duty Ratio for Maximizing Voltage Utilization Ratio R and its Correction In the first setting and its correction, the instantaneous output power Pout pulsates along with the pulsation of the current Idc as described above. That is to say, to reduce the instantaneously provided/received power Pbuf, the pulsation of the instantaneous output power Pout is allowed. The technique of causing also the virtual DC voltage Vdc used by the inverter 5 to pulsate actively, not for the purpose of setting the zero duty dz to zero such as the correction of the first setting, to improve a voltage utilization ratio R will be described in the "second setting" and its correction.

Specifically, the waveform of the virtual DC voltage Vdc is set to be equal to the absolute value Vm·|sin(ωt)| of the single-phase AC voltage Vin in the receiving period. This yields an average value Ra of the voltage utilization ratio R in the receiving period from the calculation of a formula (20), which is approximately 0.9. This can be considered as the voltage utilization ratio of the DC voltage input to the inverter 5, which is obtained by an average value with respect to the cycle of the single-phase AC voltage Vin.

$$Ra = \int_{\pi/4}^{3\pi/4} |\sin(\omega t)| d(\omega t)/(\pi/2) = \frac{2\sqrt{2}}{\pi} \quad (20)$$

Similarly, the waveform of the virtual DC voltage Vdc in the providing period is set to be equal to Vm·|cos(ωt)|.

That is to say, in the "second setting", the waveform of the virtual DC voltage Vdc is a waveform (hereinafter referred to as a "two-phase full-wave rectification waveform") obtained by performing full-wave rectification on a two-phase AC voltage having a crest value Vm.

There is a phase difference of π/2 between the providing period and the receiving period, and also, there is a phase difference of π/2 between the sine waveform and the cosine waveform. The average value Ra in the providing period is accordingly equal to that of the receiving period. The average value Ra can be thus obtained by the formula (20) in any of the providing period and the receiving period. This means that the average value Ra is improved to be (2$\sqrt{2}$/π)/(1/$\sqrt{2}$)=4/π times, that is, approximately 1.11 times that of the basic technique or the "first setting".

Not only the average value Ra but also the voltage utilization ratio R is improved per se compared with the basic technique or the "first setting", irrespective of the phase angle ωt. This is revealed from the fact that the virtual DC voltage Vdc, as it takes the two-phase full-wave rectification waveform whose minimum value is Vm/$\sqrt{2}$, is greater than or equal to the virtual DC voltage Vdc (=Vm/$\sqrt{2}$) obtained in the basic technique or the "first setting".

A specific approach for making the waveform of the virtual DC voltage Vdc the two-phase full-wave rectification waveform will now be described. First, in the receiving period, the waveform of the virtual DC voltage Vdc is set to be equal to the absolute value of the single phase AC voltage Vin, so the rectifying duty drec should be set to one. More specifically, both of the discharge duty de and the zero duty dz should be set to zero in view of the formula (4). That is to say, in the receiving period, the switch Sc is not conductive, and the inverter 5 can operate in response to requests for the currents Iu, Iv and Iw caused to flow into the inductive load 6 (without such a limitation to cause the zero-phase current iz to flow for setting a virtual DC voltage Vdc).

It can be also regarded that drec=1 holds when R=|sin (ωt)| is applied to the formula (18) which is expressed in "the first setting". This is a natural consequence of making the waveform of the virtual DC voltage Vdc the two-phase full-wave rectification waveform.

Since drec=1 holds, the current Idc is equal to the current irec1 and takes a value expressed by the formula (17). That is to say, the current Idc takes a value obtained by dividing a product of the virtual crest value Im and the first value (1−k·cos(2ωt))/2 by the absolute value |sin(ωt)| in the receiving period. This can be regarded as an application of Vm/Vdc=1/R=1/|sin(ωt)| to the formula (8) which expresses the current Idc.

In the above manner, the formulas (9) and (10) hold, and the instantaneously provided/received power Pbuf expressed by the formula (2) can be obtained in the receiving period. Moreover, the waveform of the input current Iin in the receiving period can be made the sine wave by setting the current it expressed by the formula (13) in a manner similar to the first setting.

In the providing period, also, the current Idc, the rectifying duty drec and the discharge duty dc is set similar to the "first setting". Specifically, the current Idc is set by the formula (8), the rectifying duty drec is set by the formula (16), and the discharge duty dc is set by the formula (12). It is clear from the formula (11) which is a basis for developing the formula (12) that the instantaneously provided/received power Pbuf expressed by the formula (2) can be obtained by such a setting in the providing period. However, the waveform of the virtual DC voltage Vdc is made the two-phase full-wave rectification waveform, so that R=Vdc/Vm=|cos(ωt)| is adopted.

Specifically, the current Idc takes a value expressed by a formula (21). That is to say, the current Idc takes the value obtained by dividing the product of the virtual crest value Im and the first value (1−k·cos(2ωt))/2 by the absolute value |cos(ωt)| in the providing period.

$$Idc = Im \cdot \frac{1 - k \cdot \cos(2\omega t)}{2 \cdot |\cos(\omega t)|} \quad (21)$$

Similarly, the rectifying duty drec and the discharge duty dc are expressed by formulas (22) and (23), respectively.

$$drec = 2 \cdot \frac{|\sin(\omega t) \cdot \cos(\omega t)|}{1 - k \cdot \cos(2\omega t)} \quad (22)$$

$$dc = \frac{1}{\alpha} \cdot \frac{(1-k) \cdot |\cos(\omega t) \cdot \cos(2\omega t)|}{1 - k \cdot \cos(2\omega t)} \quad (23)$$

The above reveals that by setting dc=dz=0 in the receiving period and using the duty ratios expressed by the formulas (22) and (23) in the providing period, the waveform of the virtual DC voltage Vdc can be made the two-phase full-wave rectification waveform, thus improving the voltage utilization ratio R. The above settings of the duties can be performed easily based on the first document group.

The formula (8) is adopted also in the second setting as the current Idc, so that the formulas (9), (10) and (13) hold. Accordingly, similarly to the first setting, the currents il and icd can be reduced. Such reductions in the currents il and icd are desirable from the following viewpoints of reducing power capacities required for the reactor L4 and the capacitor C4 employed in the charge and discharge circuit 4, scale and cost.

Figure 7:
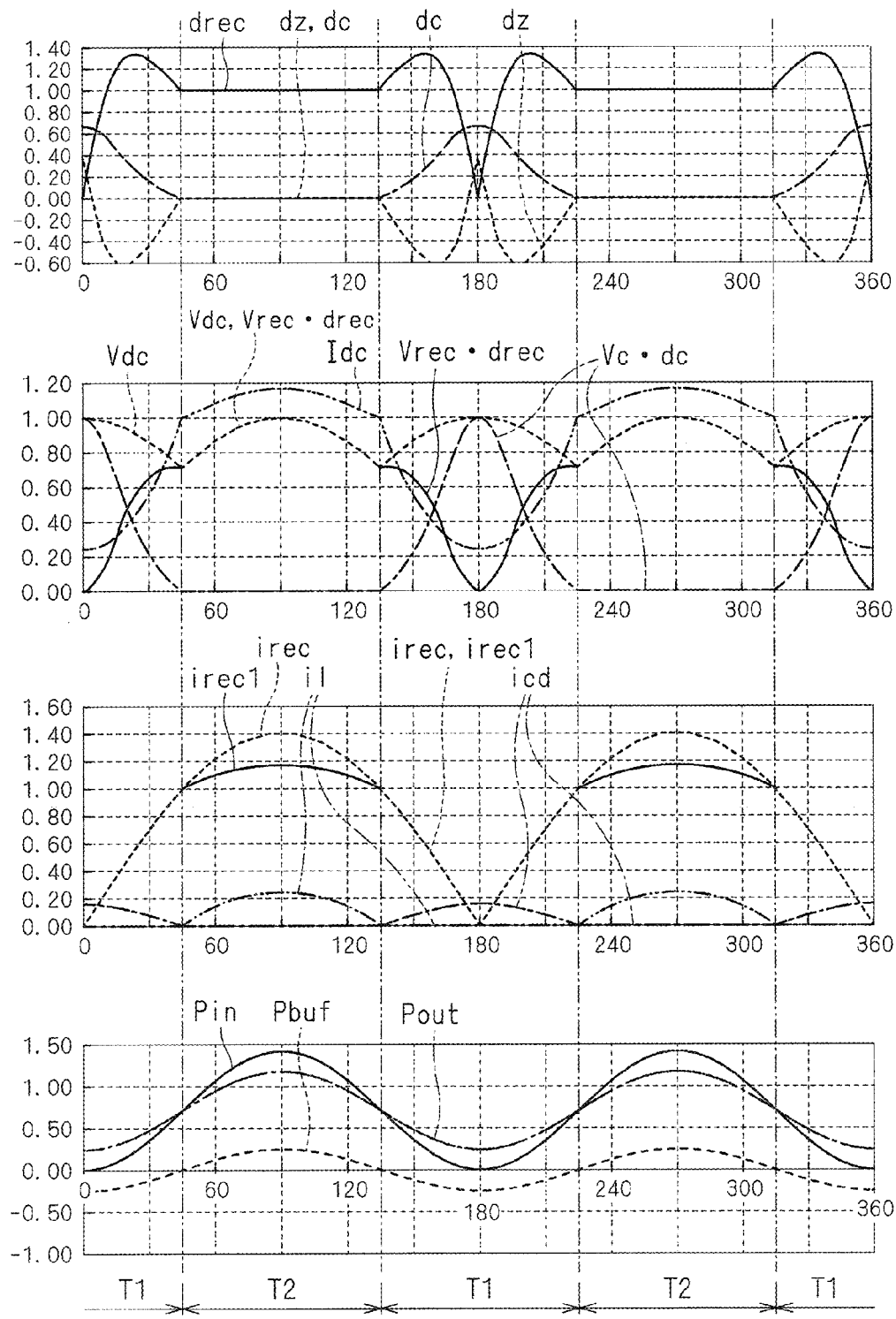

FIGS. 6 and 7 are graphs each showing the operation of the direct power converter shown in FIG. 1, each of which shows the operation when the duty ratios drec, dc and dz are set based on the "second setting". The constant k is temporarily set to zero in FIG. 6, and k=2/3 is adopted in FIG. 7.

In both of FIGS. 6 and 7, similarly to FIGS. 3 to 5, the uppermost tier shows the duty ratios drec, dc and dz, the second tier from the top shows the voltages Vrec·drec, Vc·dc and the virtual DC voltage which is constituted thereby and the current Idc, the third tier from the top shows the currents irec, icd, il and irec1, and the lowermost tier shows the instantaneous powers Pin, Pout and Pbuf. Symbols T1 and T2 respectively represent the providing period and the receiving period.

The horizontal axis represents the phase angle ωt with "degree" as the unit. The currents Idc, irec, icd, il and irec1 are converted with the crest value Im being √2. The voltages Vrec·drec and Vc·dc are converted with the crest value Vm being one. The instantaneous powers Pin, Pout and Pbuf are each obtained as the product of the voltage and current converted as described above. The current il is zero in the providing period T1, and accordingly, the current irec1 matches the current irec; dz=dc=0 in the receiving period T2, and accordingly, the voltage Vrec·drec matches the virtual DC voltage Vdc.

It is revealed that, similarly to the case of "the first setting", the instantaneously provided/received power Pbuf is reduced also in "the second setting" although the instantaneous input power Pin is distorted from the sine wave and the instantaneous output power Pout pulsates compared to the case where the constant k is temporarily set to zero. It can be also explained that, similarly to the case of "the first setting", the currents icd and il are reduced as the constant k becomes greater.

The maximum value of the current Idc in "the second setting" is smaller than the current Idc in "the first setting". Specifically, it is because in both "the first setting" and "the second setting", in view of the formula (8), the current Idc takes the maximum value Idc=(1+k)·Im/(2·R) at the phase angle ωt (=(2n+1) π/2: n is an integer, and the phase angle ωt is in the receiving period) satisfying cos(2ωt)=−1, however, R=1/√2 in "the first setting" and R=1/|sin(ωt)|=1 in "the second setting". That is to say, the maximum value of the current Idc in "the second setting" remains at 1/√2-times the maximum value of the current Idc in "the first setting".

The effect of reduced maximum value of the current Idc is particularly desirable from the viewpoint of reduced power ratings of the switching elements Sup, Svp, Swp, Sun, Svn and Swn and the diodes Dup, Dvp, Dwp, Dun, Dvn and Dwn employed in the inverter 5.

However, as can been seen from FIGS. 6 and 7, a condition of dz<0 occurs in "the second setting" in a manner similar to "the first setting" (refer to FIG. 4) even when the constant k is temporarily set to zero. Accordingly, in order to achieve dz≥0 in the providing period T1 in a manner similar to the correction of "the first setting", the setting of the rectifying duty drec is corrected as follows:

(iv) in the providing period, the rectifying duty drec takes a smaller one of (Im/Idc)·|sin(ωt)| expressed by the formula (15) (or the formula (22)) and the value (1−dc) obtained by subtracting the discharge duty dc, expressed by the formula (12) (or the formula (23)), from one.

Accordingly, the formula (4) can be satisfied and dz≥0 can be achieved. As a matter of course, since the period in which the rectifying duty drec takes the value smaller than the value expressed by the formula (15) occurs, the voltage utilization ratio R is reduced in the above period, and the virtual DC voltage Vdc cannot be made the two-phase full-wave rectification waveform.

Figure 8:
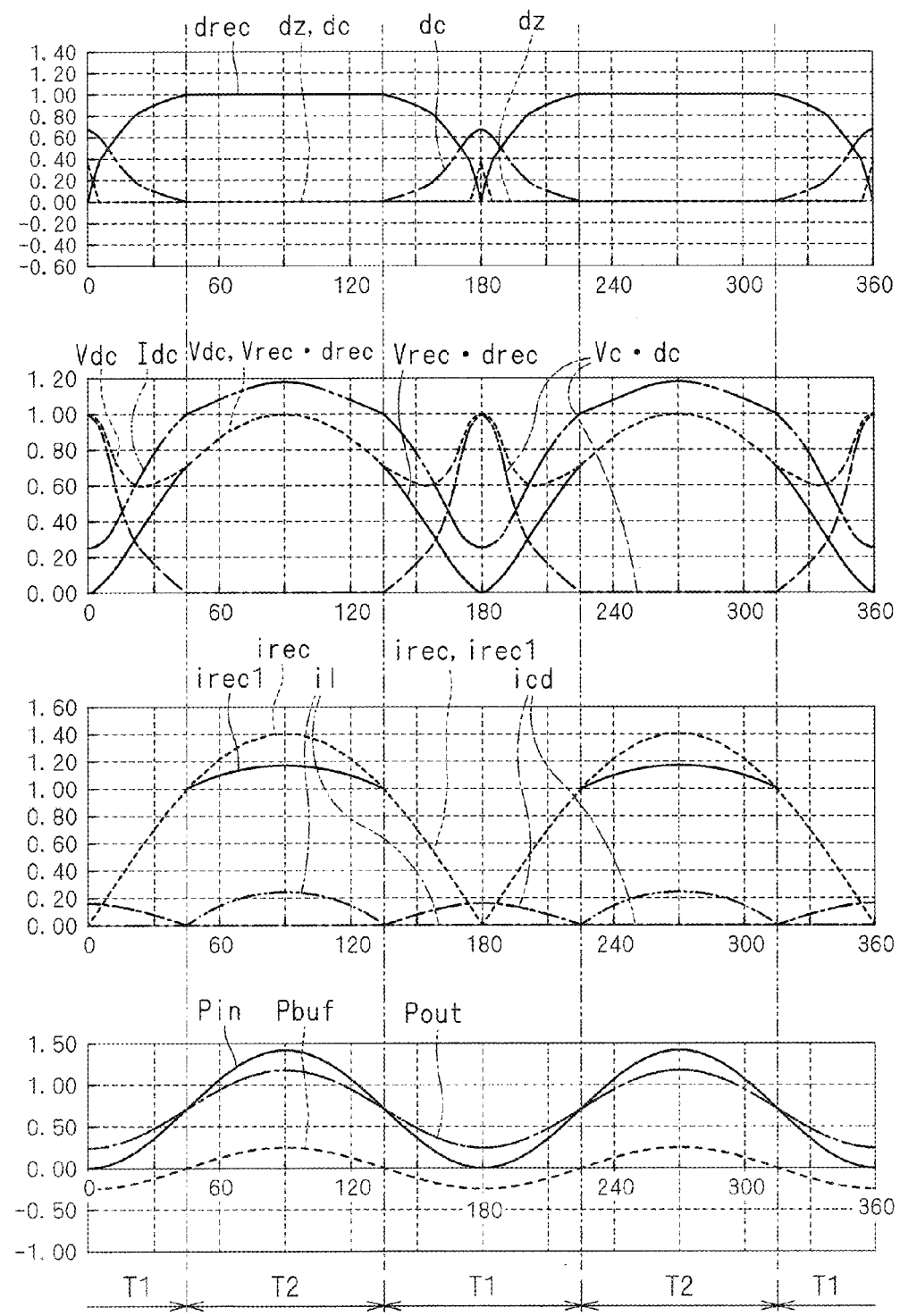
FIG. 8 is a graph showing the operation of the direct power converter shown in FIG. 1 in a corrected second setting.

FIG. 8 is a graph showing the operation of the direct power converter when the rectifying duty drec corrected in the above-described manner is employed, and its setting is equal to FIG. 7 except for the rectifying duty drec and the zero duty dz.

In the period in which the zero duty dz is negative in FIG. 7, the zero duty dz is zero, the virtual DC voltage Vdc gets lower than the two-phase full-wave rectification waveform, and the current irec is distorted from the sine wave in FIG. 8.

However, similarly to the description of the correction of "the first setting", even when the rectifying duty drec is corrected in the providing period, the reduction in the currents it and icd with adopting the constant k is not prevented, but the instantaneously provided/received power Pbuf expressed by the formula (2) can be obtained. Moreover, the improvement is not prevented in the comparison between "the first setting" and "the second setting" with regard to the maximum value of the current Idc which should be considered in the receiving period.

In "the second setting", due to the introduction of the correction (iv), although the virtual DC voltage Vdc cannot be made the two-phase full-wave rectification waveform, the period which needs to be corrected remains only within a part of the providing period. Accordingly, the effect of improving the voltage utilization ratio R is not greatly prevented in "the second setting" compared to "the first setting".

In any of the above techniques, the switch Srec is not provided and merely appears in the equivalent circuit. That is to say, conduction/non-conduction of the switch Srec is determined dependent on the operations of the switch Sc and the inverter 5.

More specifically, in the providing period, the discharge duty dc and the zero duty dz set by a formula (24) described below are adopted in view of the formulas (12) and (16) in any of "the first setting" and its correction or "the second setting" and its correction. That is to say, conduction/non-conduction of the switch Sc is controlled at the discharge duty dc expressed by the formula (24) and the switching of the inverter 5 is controlled at the zero duty dz expressed by the formula (24) (i.e., a zero-phase current flows in the period corresponding to the zero duty dz, irrespective of the voltage output from the inverter 5), thus achieving a rectifying duty drec.

$$dc = \frac{R}{\alpha} \cdot \frac{(1-k)\cdot\cos(2\omega t)}{1-k\cdot\cos(2\omega t)}$$
$$dz = 1 - dc - 2R \cdot \frac{|\sin(\omega t)|}{1-k\cdot\cos(2\omega t)}$$
however, when $dz < 0$ in the above formula, $dz = 0$ \quad (24)

In the receiving period, the switch Sc is not conductive and dc=0, so that the switching of the inverter 5 is controlled at the zero duty dz taking the value $(1-R/|\sin(\omega t)|)$ in view of the formula (18) in any of "the first setting" and its correction or "the second setting" and its correction.

For example, $R=1/\sqrt{2}$ holds in "the first setting" and its correction; $R=|\cos(\omega t)|$ holds in the providing period, and $R=|\sin(\omega t)|$ holds in "the second setting" and its correction in the receiving period.

(b-4) Example of Technique for Inputting Current Idc to Inverter 5

This section will describe an example for achieving the formula (8) adopted for the current Idc commonly in the "first setting" and the "second setting" regarding duty ratios.

Described below is an example in which well-known dq-axis control is performed as for the operation of a normal AC load. The power formula on the dq axes is typically expressed by a formula (25). Symbols V* and I respectively represent a command value of a voltage applied to the AC load and a current flowing through the AC load. They both are an alternating, and thus, dots indicating that they are represented as complex numbers are placed above both of the symbols V* and I. Note that the q-axis voltage ideally follows a command value Vq* thereof, and the d-axis voltage ideally follows a command value Vd* thereof.

$$P+jQ=\dot{V}^*\cdot\dot{I}=Vd^*\cdot Id+Vq^*\cdot Iq+j(Vq^*\cdot Id-Vd^*\cdot Iq) \quad (25)$$

The power supplied from the DC power supply lines LH and LL to the inverter 5 has no reactive power, and thus, the power is expressed by the formula (26) ignoring the third term of the rightmost-hand side of the formula (25).

$$Pdc=Vd^*\cdot Id+Vq^*\cdot Iq \quad (26)$$

The instantaneous output power Pout expressed by the formula (9) matches the formula (26), so the formula (27) holds.

$$Pdc = Pout = \frac{Vm\cdot Im}{2}(1-k\cdot\cos(2\omega t)) \quad (27)$$
$$= \frac{Vm\cdot Im}{2} - \frac{k\cdot Vm\cdot Im}{2}\cos(2\omega t)$$

Figure 9:
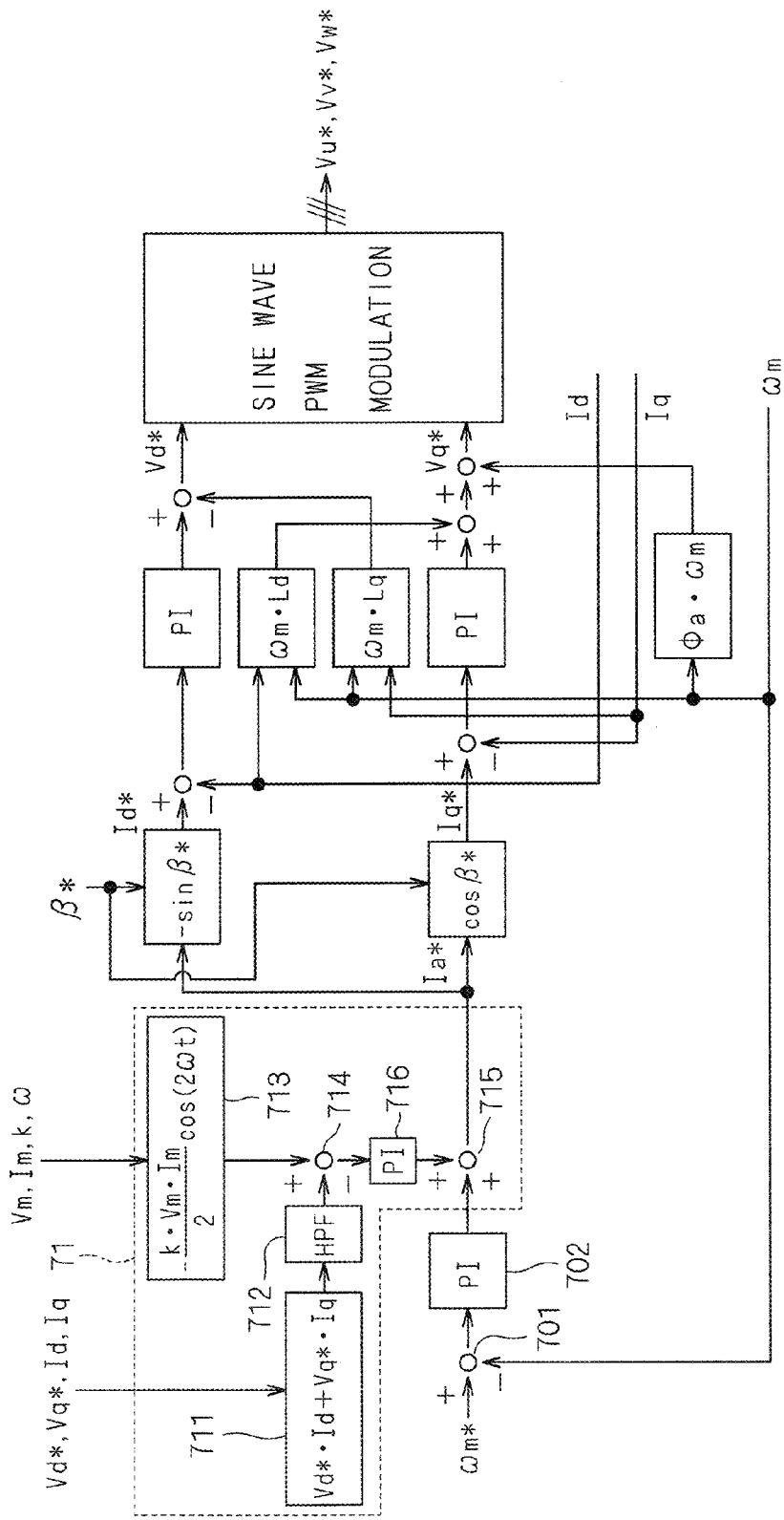
FIG. 9 is a block diagram showing an example configuration for control on a DC current, which is described in the embodiment.

Control to achieve the formula (8) can thus be performed by performing control so that an AC component of the formula (26) and the second term of the rightmost-hand side of the formula (27) match each other. FIG. 9 shows, as a block diagram, an example configuration for performing the control above. The configuration is provided in, for example, the configuration shown as a controller 10 in FIG. 1.

To briefly describe a part of the configuration of FIG. 9 showing a well-known technique, a current phase command value β* is input to obtain trigonometric function values cos β* and −sin β*, from these and a current command value Ia*, a q-axis current command value Iq* and a d-axis current command value Id* are generated. On the assumption that the inductive load 6 is a rotating machine, a q-axis voltage command value Vq* and a d-axis voltage command value Vd* are obtained based on a rotational angular velocity ωm of the rotating machine, a field magnetic flux Φa of the rotating machine, a d-axis inductance Ld and a q-axis inductance Lq of the rotating machine, a q-axis current command value Iq* and a d-axis current command value Id*, and a q-axis current Iq and a d-axis current Id. Voltage command values Vu*, Vv* and Vw* for controlling the inverter 5 are generated from the q-axis voltage command value Vq* and the d-axis voltage command value Vd*.

In the configuration shown in FIG. 1, for example, a velocity detector 9 detects currents Iu, Iv and Iw flowing through the inductive load 6 and based on these, provides the rotational angular velocity ωm, the q-axis current Iq, and the d-axis current Id obtained from them to the controller 10.

The controller 10 obtains, based on the voltage command values Vu*, Vv* and Vw*, signals SSup, SSvp, SSwp, SSun, SSvn and SSwn (see FIG. 1) for respectively controlling the operations of the switching elements Sup, Svp, Swp, Sun, Svn and Swn of the inverter 5 through arithmetic processing (not shown, e.g., see Japanese Patent Application Laid-Open No. 2011-193678).

The controller 10 also generates signals SSc and SSl that respectively control the operations of the switches Sc and Sl, which are generated based on the duty ratios drec, dc, dz and dl (e.g., see the first document group).

Described below is a processor 71 for performing control so that the AC component of the formula (26) and the second term of the rightmost-hand side of the formula (27) match each other. The processor 71 includes a DC power calculator 711, a pulsating component extractor 712, a pulsating component calculator 713, a subtracter 714, an adder 715 and a PI processor 716.

The DC power calculator 711 receives the q-axis voltage command value Vq* and the d-axis voltage command value Vd*, and the q-axis current Iq and the d-axis current Id, and calculates a DC power Pdc based on the formula (26) above, thus providing the DC power Pdc to the pulsating component extractor 712.

The pulsating component extractor 712 extracts and outputs the AC component of the formula (26). The pulsating component extractor 712 is achieved by, for example, a highpass filter HPF.

The pulsating component calculator 713 receives the crest values Vm and Im, the power supply angular velocity ω and the constant k, thus obtaining the second term of the rightmost-hand side of the formula (27). The crest values Vm and Im and the power supply angular velocity ω can be input to the pulsating component calculator 713 as the information obtained from the single-phase AC power supply 1 (see FIG. 1).

As described above, a desired processing is causing the AC component of the formula (26) and the second term of the rightmost-hand side of the formula (27) to match each other, and thus, control should be performed so as to reduce a difference between the output of the pulsating component extractor 712 and the output of the pulsating component calculator 713. The subtracter 714 thus obtains the difference, thus outputting, to the adder 715, a value obtained by the PI processor 716 performing integral proportional control on the difference.

The adder 715 performs processing to correct a current command value Ia* in normal processing by an output of the PI processor 716. Specifically, first, a subtracter 701 obtains a deviation of the rotational angular velocity ωm from a command value ωm* thereof in normal processing to obtain the current command value Ia*. A PI processor 702 performs integral proportional control on the deviation to once obtain the current command value Ia*. The adder 715 then performs processing to increase the current command value Ia* with the output from the PI processor 716.

The known technique above is applied to the current command value Ia* corrected by the processor 71 as described above, thus generating the q-axis voltage command value Vq* and the d-axis voltage command value Vd*. Such control is control to provide feedback regarding the q-axis voltage command value Vq* and the d-axis voltage command value Vd*, and the q-axis current Iq and the d-axis current Id, causing a difference output from the subtracter 714 to be closer to zero. That is to say, such control can cause the AC component of the formula (26) and the second term of the rightmost-hand side of the formula (27) to match each other.

C. Description of Advantages in Charge and Discharge Circuit 4

(c-1) Description of Advantages of Buffer Circuit 4a

This section will describe that reducing the instantaneously provided/received power Pbuf allows the use of an electrolytic capacitor as the capacitor C4, thus achieving the buffer circuit 4a inexpensively.

Figure 10:
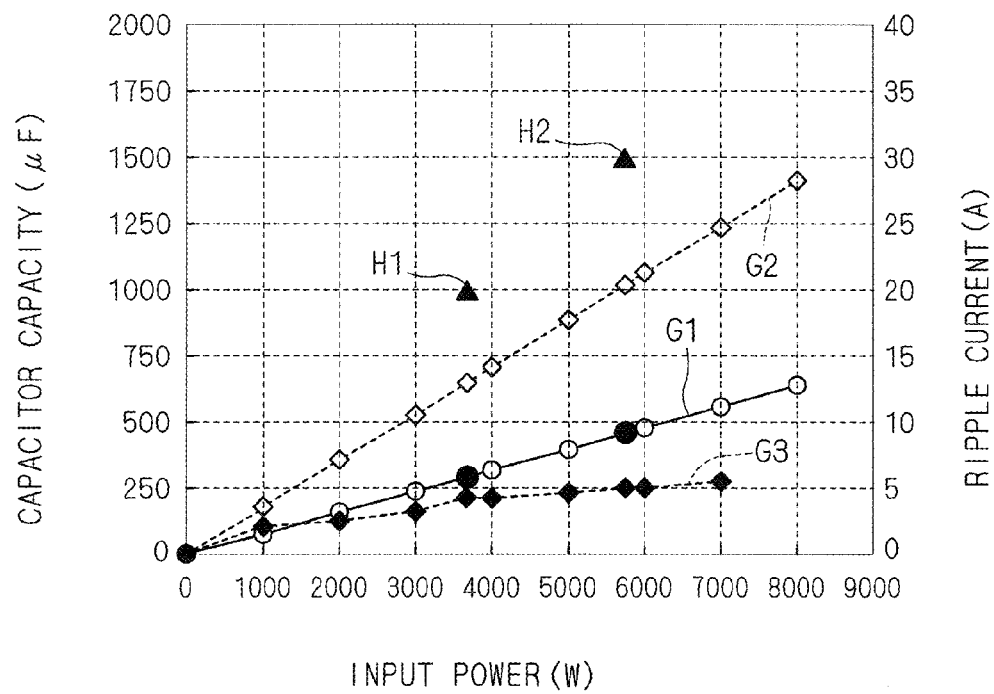
FIG. 10 is a graph showing a relationship among an input power, the capacitance of a capacitor, and a ripple current in the direct power converter.

FIG. 10 is a graph showing a relationship between the electrostatic capacitance of the electrostatic capacitor (hereinafter referred to as a "capacitor capacity": left vertical axis), used or required in the direct power converter that receives and processes an input power (an average value of the instantaneous input power Pin: horizontal axis) and the ripple current and its allowable value (right vertical axis).

Symbols H1 and H2 each represent the capacitor capacity used in a case where a single-phase power factor correction circuit is used. The symbols H1 and H2 respectively represent data in a case where air conditioners have air conditioning abilities of 6 kW and 11.2 kW. The power factor correction circuit can herein be regarded as having a configuration in which the switch Sc is shorted and removed from the charge and discharge circuit 4, and a connection point between the reactor L4 and the converter 3 is not directly connected with the inverter 5. In this configuration, a series connection of the diode D40 and the reactor L4 is provided between the converter 3 and the inverter 5 in the DC power supply line LH, and the capacitor C4 is connected in parallel with the inverter 5 between the DC power supply lines LH and LL.

According to Yoshiya Ohnuma, Jun-ichi Itoh, "Experimental Verification of Single Phase to Three Phase Converter Using an Active Buffer circuit with a Charge Circuit", 2010 IEEJ Industry Applications Society Conference 1-124 (2010) and Yoshiya Ohnuma, Jun-ichi Itoh, "Comparison of Boost Chopper and Active Buffer as Single to Three Phase Converter", The 2011 Annual Meeting of the Institute of Electrical Engineers of Japan, No. 4-042 (2011), the capacitor capacity C required in the basic technique is obtained by a formula (28). Note that a maximum value Vcmax and a minimum value Vcmin of the both-end voltage Vc are introduced.

$$C = \frac{Vm \cdot Im}{\omega(Vc\ \text{max}^2 - Vc\ \text{min}^2)} \quad (28)$$

On a graph G1, values obtained by calculating capacitor capacities required in the basic technique (the case where the constant k is temporarily set to zero in the "first setting") are plotted. Note that maximum value Vcmax=400+50=450 (V) and minimum value Vcmin=400−50=350 (V) hold. Solid circles on the graph G1 indicate the same cases indicated by the symbols H1 and H2 in input power. However, actually used capacitor capacities are plotted as the symbols H1 and H2, and back calculation of them from the formula (27) yields a deviation of approximately ±5% in the both-end voltage Vc.

As can be seen from the comparison between the symbols H1 and H2 and the solid circles on the graph G1, in the basic technique, capacitor capacities are reduced to approximately ⅓ to ¼ times compared with a normal power factor correction circuit.

In the basic technique, however, a ripple current shown by a graph G2 flows through the capacitor C4. A graph G3 shows a ripple current (e.g., values at 45° C. using an electrolytic capacitor of GW-series (105° C. specifications) from Nichicon Corporation) allowable when the capacitor capacity obtained by the graph G1 is obtained by the electrolytic capacitor. The comparison between the graphs G2 and G3 reveals that in the basic technique, the capacitor C4 cannot be achieved by an electrolytic capacitor from the perspective of whether a ripple current is allowable.

In the "first setting" and "second setting" above, however, by introducing the constant k (<1), an amount of pulsations of the power stored in the capacitor C4 can be reduced compared to the basic technique. This achieves the capacitor C4 by an electrolytic capacitor by setting the constant k in accordance with a desired capacitor capacity, contributing to achieving the charge and discharge circuit 4 inexpensively.

(c-2) Description of Advantages of Boost Circuit 4b

This section will describe that the instantaneously provided/received power Pbuf is reduced to achieve the boost circuit 4b inexpensively.

Even the basic technique requires lower power capacity than a normal power factor correction circuit does, which will be described first. From the formula (1), the power passing through a power factor correction circuit is obtained by a formula (29).

$$\frac{Vm \cdot Im}{\pi} \int_0^\pi \frac{1}{2}(1-\cos 2\theta)d\theta = \frac{Vm \cdot Im}{2} \quad (29)$$

In the basic technique, meanwhile, the power provided to the capacitor C4 via the boost circuit 4b is obtained by a formula (30) based on the formula (2).

$$\frac{Vm \cdot Im}{\pi} \int_{\pi/4}^{3\pi/4} \left(-\frac{1}{2}\cos 2\theta\right)d\theta = \frac{Vm \cdot Im}{2\pi} \quad (30)$$

As revealed from the comparison between the formulas (29) and (30), in the basic technique, the power capacity required for the boost circuit 4b is reduced to $1/\pi$ times (approximately ⅓ times) compared with the power factor correction circuit.

Introducing the constant (k<1) in the "first setting" and "second setting" reduce the instantaneously provided/received power Pbuf compared to the basic technique, thus revealing that the power capacity is further reduced.

Even in the basic technique, a peak value of the current il flowing through the reactor L4 is also reduced to ½ times the peak value (which is a crest value Im) in a case of the power factor correction circuit, as expressed by a formula (31).

$$il = Im\left(|\sin(\omega t)| - \frac{1}{2|\sin(\omega t)|}\right) \leq \frac{Im}{2}(\omega t = \pi/2, 3\pi/2) \quad (31)$$

Introducing the constant k (<1) in the "first setting" and the "second setting" can reduce a current il compared with the basic technique, thus revealing that the power capacity required for the reactor L4 is further reduced in view of the formula (31).

D. Modifications

In the basic technique as well as the technique involving introducing the constant k (<1) in the "first setting" and the "second setting", the filter 2 can also be provided between the converter 3 and the charge and discharge circuit 4.

Figure 11:
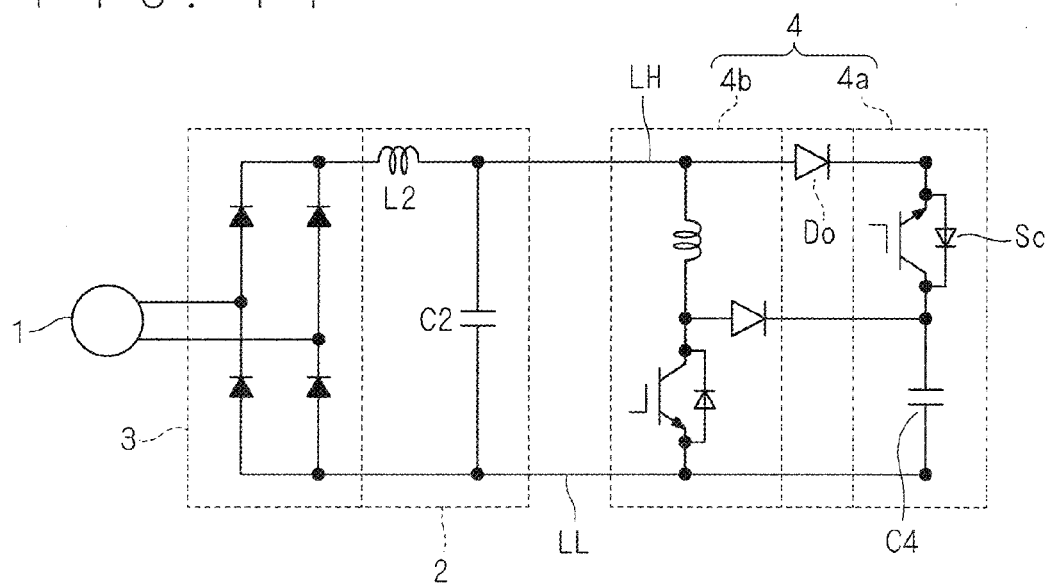
FIG. 11 is a circuit diagram showing a modification of the direct power converter shown in FIG. 1.

FIG. 11 is a circuit diagram in a case where the filter 2 is provided between the converter 3 and the charge and discharge circuit 4, as the modification, showing only the vicinity thereof.

In the adoption of such a configuration, a diode Do is desirably provided between the filter 2 and the buffer circuit 4a in the DC power supply line LH. An anode and cathode of the diode Do are disposed respectively at the filter 2 side and at the buffer circuit 4a side. The diode Do can prevent the both-end voltage Vc across the capacitor C4 from affecting the both-end voltage across the capacitor C2.

While the disclosure has been shown and described in detail, the foregoing description is in all aspects illustrative and not restrictive. It is therefore regarded that numerous modifications which have not illustrated can be devised without departing from the scope of the disclosure.

The invention claimed is:

1. A method for controlling a direct power converter, said direct power converter comprising:

a first power supply line;

a second power supply line which is applied with a potential lower than said first power supply line is applied;

a converter including an input side connected with a single-phase AC power supply and an output side connected with said first power supply line and said second power supply line, and performing single-phase full-wave rectification;

a charge and discharge circuit located between said first power supply line and said second power supply line; and an inverter that converts a DC voltage between said first power supply line and said second power supply line into an AC voltage, said charge and discharge circuit comprising a buffer circuit including a capacitor and a first switch connected in series with said capacitor at a side close to said first power supply line between said first power supply line and said second power supply line, and providing and receiving power between said first power supply line and said second power supply line, and a boost circuit that boosts a rectified voltage from said converter to charge said capacitor, said buffer circuit providing power to said first power supply line and said second power supply line in a first period in which a cosine value to a value of twice a phase angle of an AC waveform output from said single-phase AC power supply is positive when the AC waveform is regarded as a sine value of the phase angle, and receiving power from said first power supply line and said second power supply line in a second period in which said cosine value is negative, said method comprising steps of:

rendering said first switch conductive at a discharge duty to discharge said capacitor in said first period, and is rendered non-conductive in said second period;

rendering said converter conductive at a rectifying duty; and rendering both a sum, in said first period, of a product of said rectified voltage and said rectified duty and a product of a both-end voltage of said capacitor and said discharge duty and a product, in said second period, of said rectified voltage and said rectifying duty to take a product of a crest value of an AC voltage of said single-phase AC power supply, a first value, and a second value, wherein said first value is half a value obtained by subtracting, from one, a product of a positive constant less than one and said cosine value, and said second value is a value obtained by dividing a virtual crest value, which is $\sqrt{2}$-times an effective value of a first current input to the converter by a second current input to said inverter.

2. The method for controlling a direct power converter according to claim 1,
wherein said rectifying duty takes a smaller one of a product of said second value and an absolute value of said sine value and a value obtained by subtracting said discharge duty from one in said first period.

3. The method for controlling a direct power converter according to claim 2,
wherein said rectifying duty takes a value obtained by dividing a product of said second value and said first value by said absolute value of said sine value in said second period.

4. The method for controlling a direct power converter according to claim 3,
wherein a value of $\sqrt{2}$-times an absolute value, which is taken by said first current at a boundary between said first period and said second period, is adopted as said virtual crest value of said first current.

5. The method for controlling a direct power converter according to claim 4, wherein
said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, and
said second switch of said boost circuit is controlled to control a current flowing through said reactor in said second period.

6. The method for controlling a direct power converter according to claim 3, wherein
said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, and
said second switch of said boost circuit is controlled to control a current flowing through said reactor in said second period.

7. The method for controlling a direct power converter according to claim 2,
wherein in said second period, said rectifying duty takes a value one; and
said second current takes a value obtained by dividing a product of said virtual crest value of said first current and said first value by said absolute value of said sine value.

8. The method for controlling a direct power converter according to claim 7,
wherein said second current takes a value obtained by dividing a product of said virtual crest value of said first current and said first value by an absolute value of a cosine value of said phase angle in said first period.

9. The method for controlling a direct power converter according to claim 8,
wherein a value of $\sqrt{2}$-times an absolute value, which is taken by said first current at a boundary between said first period and said second period, is adopted as said virtual crest value of said first current.

10. The method for controlling a direct power converter according to claim 9, wherein
said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, and
said second switch of said boost circuit is controlled to control a current flowing through said reactor in said second period.

11. The method for controlling a direct power converter according to claim 8, wherein
said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, and
said second switch of said boost circuit is controlled to control a current flowing through said reactor in said second period.

12. The method for controlling a direct power converter according to claim 7,
wherein a value of $\sqrt{2}$-times an absolute value, which is taken by said first current at a boundary between said first period and said second period, is adopted as said virtual crest value of said first current.

13. The method for controlling a direct power converter according to claim 12, wherein
said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, and
said second switch of said boost circuit is controlled to control a current flowing through said reactor in said second period.

14. The method for controlling a direct power converter according to claim 7, wherein
said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, and
said second switch of said boost circuit is controlled to control a current flowing through said reactor in said second period.

15. The method for controlling a direct power converter according to claim 2,
wherein a value of $\sqrt{2}$-times an absolute value, which is taken by said first current at a boundary between said first period and said second period, is adopted as said virtual crest value of said first current.

16. The method for controlling a direct power converter according to claim 15, wherein
said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, and
said second switch of said boost circuit is controlled to control a current flowing through said reactor in said second period.

17. The method for controlling a direct power converter according to claim 2, wherein
said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, and
said second switch of said boost circuit is controlled to control a current flowing through said reactor in said second period.

18. The method for controlling a direct power converter according to claim 1,
wherein a value of $\sqrt{2}$-times an absolute value, which is taken by said first current at a boundary between said first period and said second period, is adopted as said virtual crest value of said first current.

19. The method for controlling a direct power converter according to claim 18, wherein
said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, and
said second switch of said boost circuit is controlled to control a current flowing through said reactor in said second period.

20. The method f or controlling a direct power converter according to claim 1, wherein
said boost circuit comprises:
a diode including an anode and a cathode that is connected between said first switch and said capacitor;
a reactor connected between said first power supply line and said anode, through which a current input to said boost circuit flows; and
a second switch connected between said second power supply line and said anode, and
said second switch of said boost circuit is controlled to control a current flowing through said reactor in said second period.

* * * * *